United States Patent
Ranga et al.

(10) Patent No.: US 10,215,115 B1
(45) Date of Patent: Feb. 26, 2019

(54) METHODS AND SYSTEMS FOR INDIVIDUAL CYLINDER AIR-FUEL RATIO CONTROL IN A COMBUSTION ENGINE

(71) Applicant: Ford Global Technologies, LLC, Dearborn, MI (US)

(72) Inventors: Adithya Pravarun Re Ranga, Northville, MI (US); Gopichandra Surnilla, West Bloomfield, MI (US); Vadivelan Jagadeesan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/886,694

(22) Filed: Feb. 1, 2018

(51) Int. Cl.
*F02D 41/00* (2006.01)
*F02D 13/02* (2006.01)

(52) U.S. Cl.
CPC ....... *F02D 41/008* (2013.01); *F02D 13/0223* (2013.01); *F02D 41/0002* (2013.01)

(58) Field of Classification Search
CPC .... F02D 41/00; F02D 41/008; F02D 13/0223; F02D 41/0002
See application file for complete search history.

(56) References Cited

U.S. PATENT DOCUMENTS

| | | | |
|---|---|---|---|
| 5,265,416 A * | 11/1993 | Hamburg | F01N 11/007 60/274 |
| 6,382,198 B1 | 5/2002 | Smith et al. | |
| 7,802,563 B2 | 9/2010 | Behr et al. | |
| 9,194,316 B2 | 11/2015 | Miyamoto et al. | |
| 9,657,663 B2 * | 5/2017 | Santillo | F01N 3/08 |
| 9,752,523 B2 * | 9/2017 | Yoshikawa | F02D 41/1441 |
| 2009/0018756 A1 | 1/2009 | Storhok et al. | |
| 2009/0241925 A1 | 10/2009 | Behr et al. | |
| 2013/0184969 A1 | 7/2013 | Rollinger et al. | |
| 2016/0115879 A1 | 4/2016 | Lehmen et al. | |
| 2016/0258375 A1 | 9/2016 | Jammoussi et al. | |

OTHER PUBLICATIONS

Cavina, N. et al., "Closed-loop Individual Cylinder Air-Fuel Ratio Control via UEGO Signal Spectral Analysis," Proceedings of the 17th World Congress of the International Federation of Automatic Control, Jul. 6, 2008, Seoul, Korea, 8 pages.
Meyer, J. et al., "A Model Based Estimator for Cylinder Specific Air-to-Fuel Ratio Corrections," Journal of Dynamic Systems, Measurement, and Control, vol. 133, No. 3, May 2011, Available Online Mar. 23, 2011, 14 pages.
Wang, C. et al., "Estimation of Individual Cylinder Air-Fuel Ratio in Gasoline Engine with Output Delay," Journal of Sensors, vol. 2016, Article ID 5908459, Available as Early as Jul. 14, 2016, 10 pages.

* cited by examiner

*Primary Examiner* — Hieu T Vo
(74) *Attorney, Agent, or Firm* — Julia Voutyras; McCoy Russell LLP

(57) ABSTRACT

Methods and systems are provided for controlling individual cylinder air-fuel ratio (AFR) in a combustion engine. In one example, a method may include measuring a high-frequency exhaust gas composition, parsing the measured high-frequency exhaust gas composition to determine a first cylinder-specific component of the high-frequency exhaust gas composition, estimating an air-fuel ratio (AFR) based on the first cylinder-specific component of the measured high-frequency exhaust gas composition, and correcting the estimated AFR by subtracting intercylinder exhaust gas interactions from the estimated AFR.

20 Claims, 10 Drawing Sheets

METHODS AND SYSTEMS FOR INDIVIDUAL CYLINDER AIR-FUEL RATIO CONTROL IN A COMBUSTION ENGINE

FIELD

The present description relates generally to methods and systems for individual cylinder air-to-fuel ratio control in a combustion engine to raise engine performance and reduce emissions.

BACKGROUND AND SUMMARY

Combustion engines commonly employ exhaust gas oxygen sensors, such as universal exhaust gas oxygen (UEGO) and heated exhaust gas oxygen (HEGO) sensors, to measure the air-fuel ratio (AFR) of the engine exhaust. The AFR measured by the exhaust gas oxygen sensors is fed back to a closed-loop engine fueling controller that responsively adjusts bank-wise fueling to the engine to achieve a target overall AFR (e.g., stoichiometric engine operation, $\square=1$) for each bank of cylinders. Operating near stoichiometric AFR enables the engine to operate more efficiently, with reduced emissions. The feedback control algorithms can employ adaptive learning to reduce closed-loop fueling errors and to reduce overall bank to bank fueling variability.

However, bank-wise fueling control algorithms do not address individual cylinder to cylinder AFR variability during engine operation. In particular, bank-wise fueling may achieve a target overall AFR averaged over all cylinders in a bank; however, individual cylinder AFR values can fluctuate above and below the target AFR value. Imbalances in individual cylinder AFR may cause fuel injector imbalances, intake air charge and distribution errors, combustion variability, and fueling variability. Consequently, individual cylinder AFR variability can lead to reduced engine performance (e.g., higher torque variability, reduced vehicle drivability, increased NVH, and the like) and increased emissions.

The inventors herein have recognized the above issues and have devised numerous approaches to at least partially address them. In one example, a method for an engine may comprise, measuring a high-frequency exhaust gas composition, and for a first cylinder of the engine, parsing the measured high-frequency exhaust gas composition to determine a first cylinder-specific component of the high-frequency exhaust gas composition, estimating an air-fuel ratio (AFR) based on the first cylinder-specific component of the measured high-frequency exhaust gas composition, and correcting the estimated AFR by subtracting intercylinder exhaust gas interactions from the estimated AFR. In this way, AFR variability between individual cylinders of a combustion engine can be reduced, thereby increasing vehicle drivability, reducing engine NVH, and reducing emissions. As one example, individual cylinder AFR values in a bank can be determined from a single high-frequency exhaust gas composition sensor positioned in the exhaust manifold. Thus, individual cylinder AFR variability may be reduced, while maintaining and/or reducing engine manufacturing cost and complexity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 2:
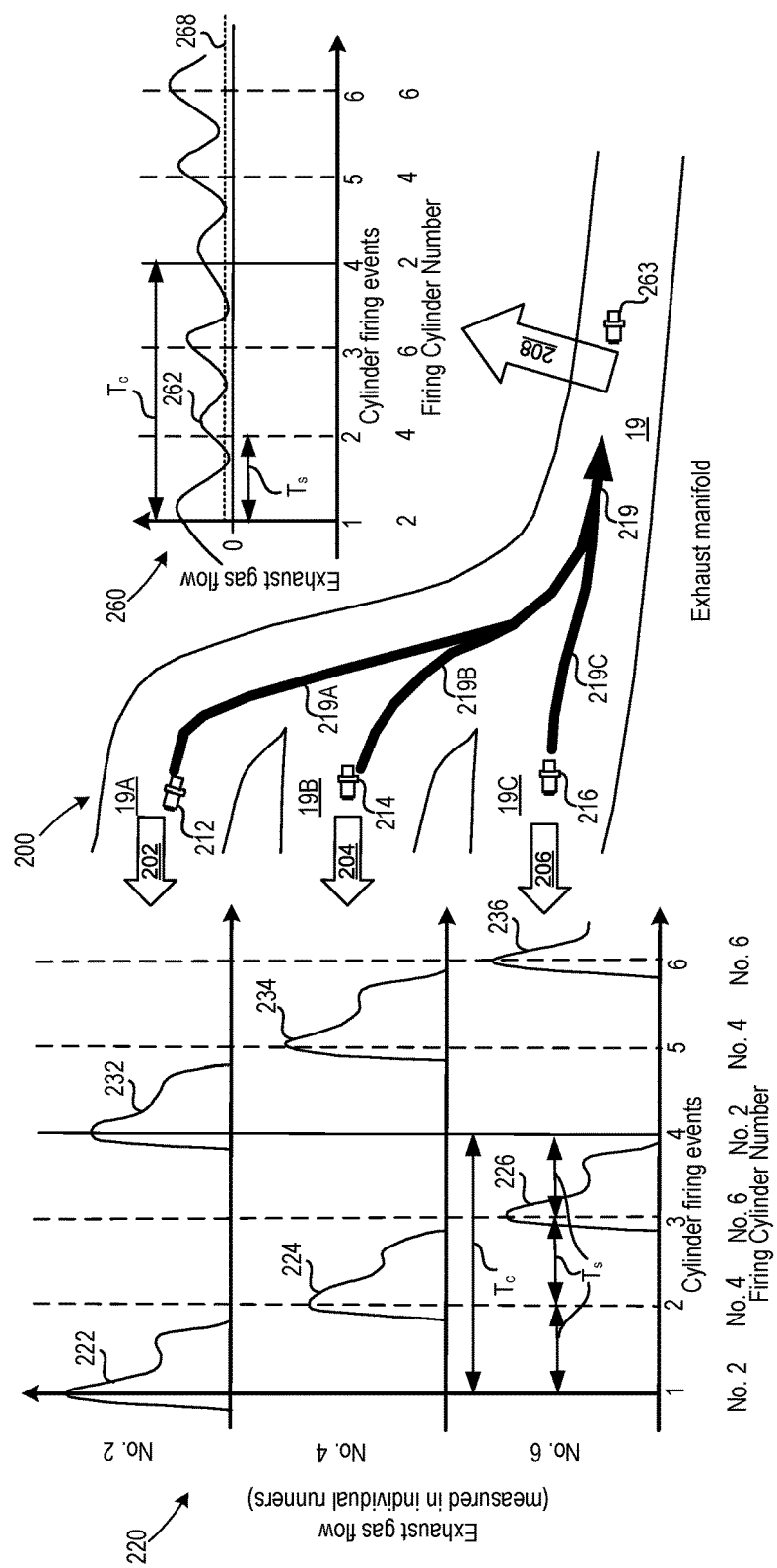
FIG. 2 shows a schematic diagram illustrating high-frequency exhaust gas oxygen measurements for a bank of engine cylinders.
Figure 3:
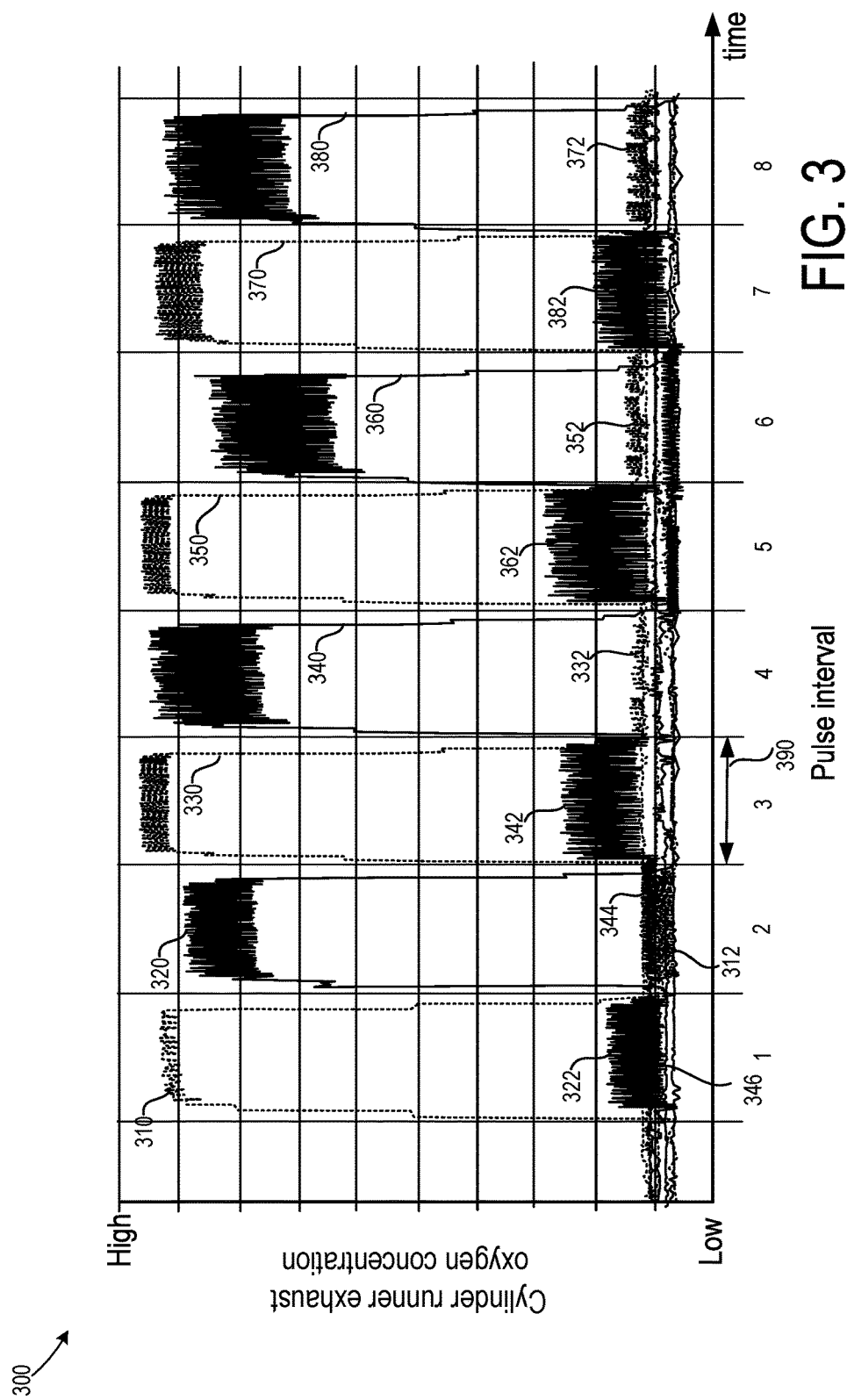
FIGS. 3 and 4 show plots of high-frequency exhaust gas oxygen data measured in individual cylinder exhaust runners.
Figure 4:
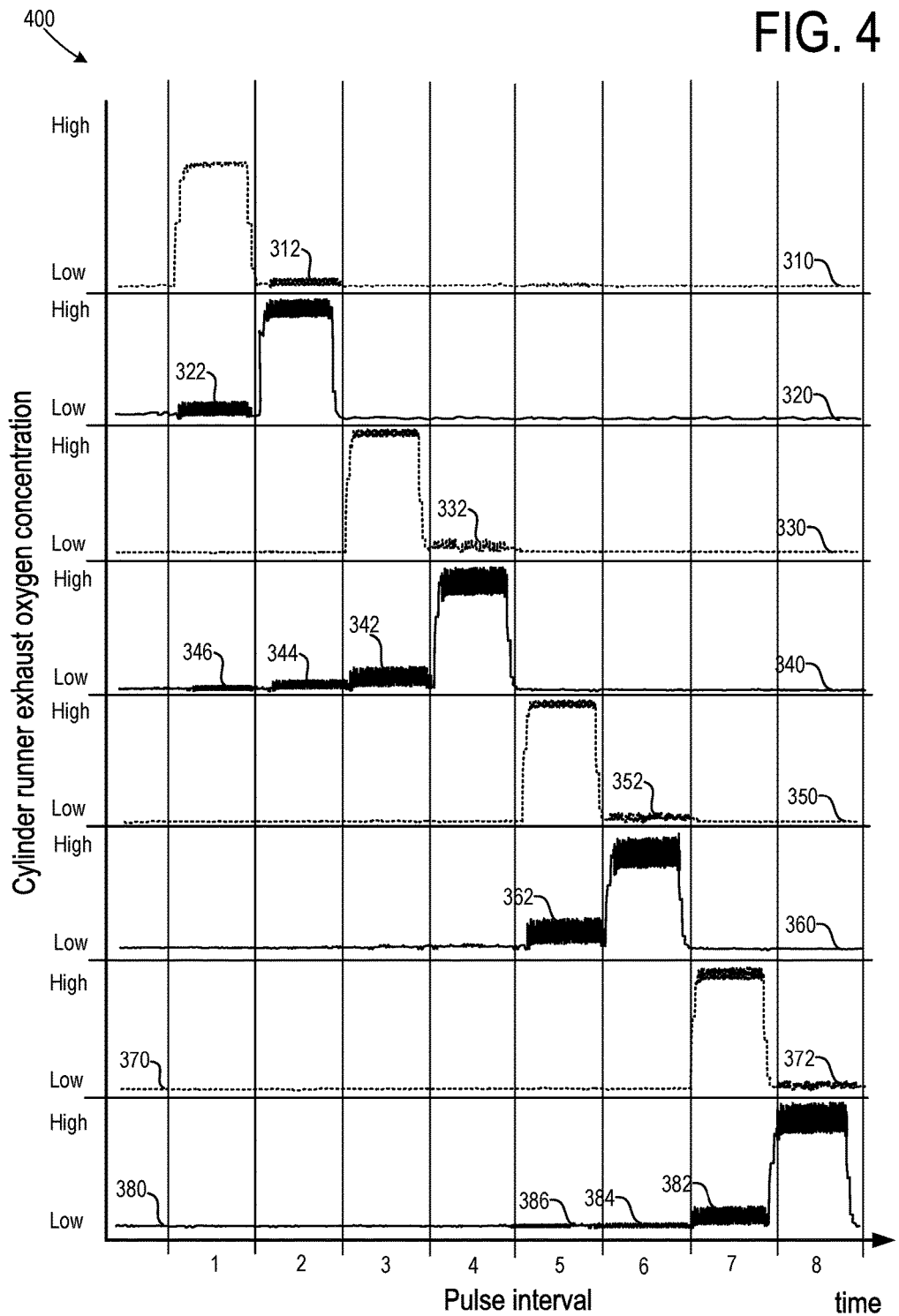
Figure 6:
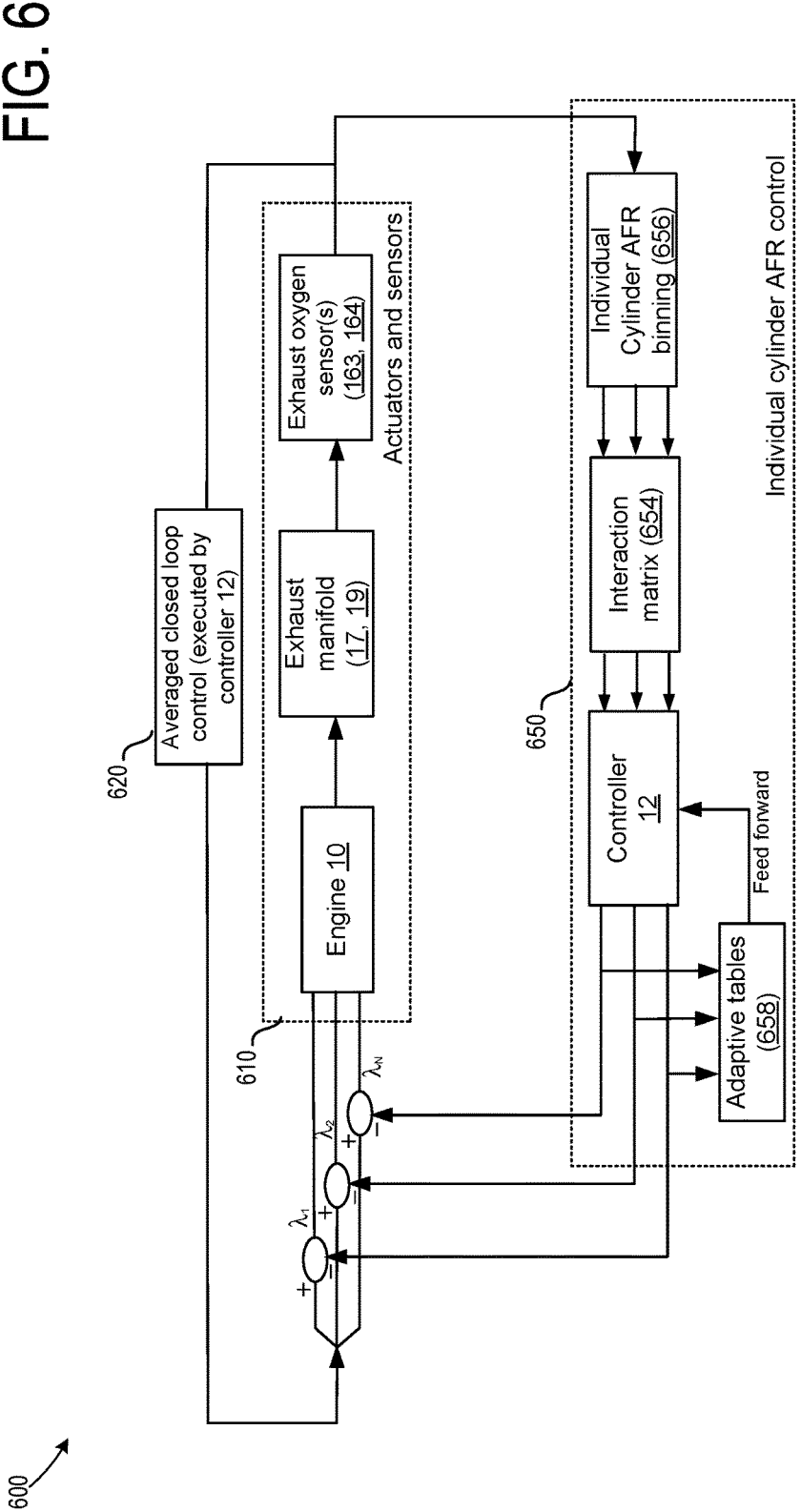
FIG. 6 shows a schematic diagram of a control algorithm for controlling AFR in individual engine cylinders.
Figure 7:
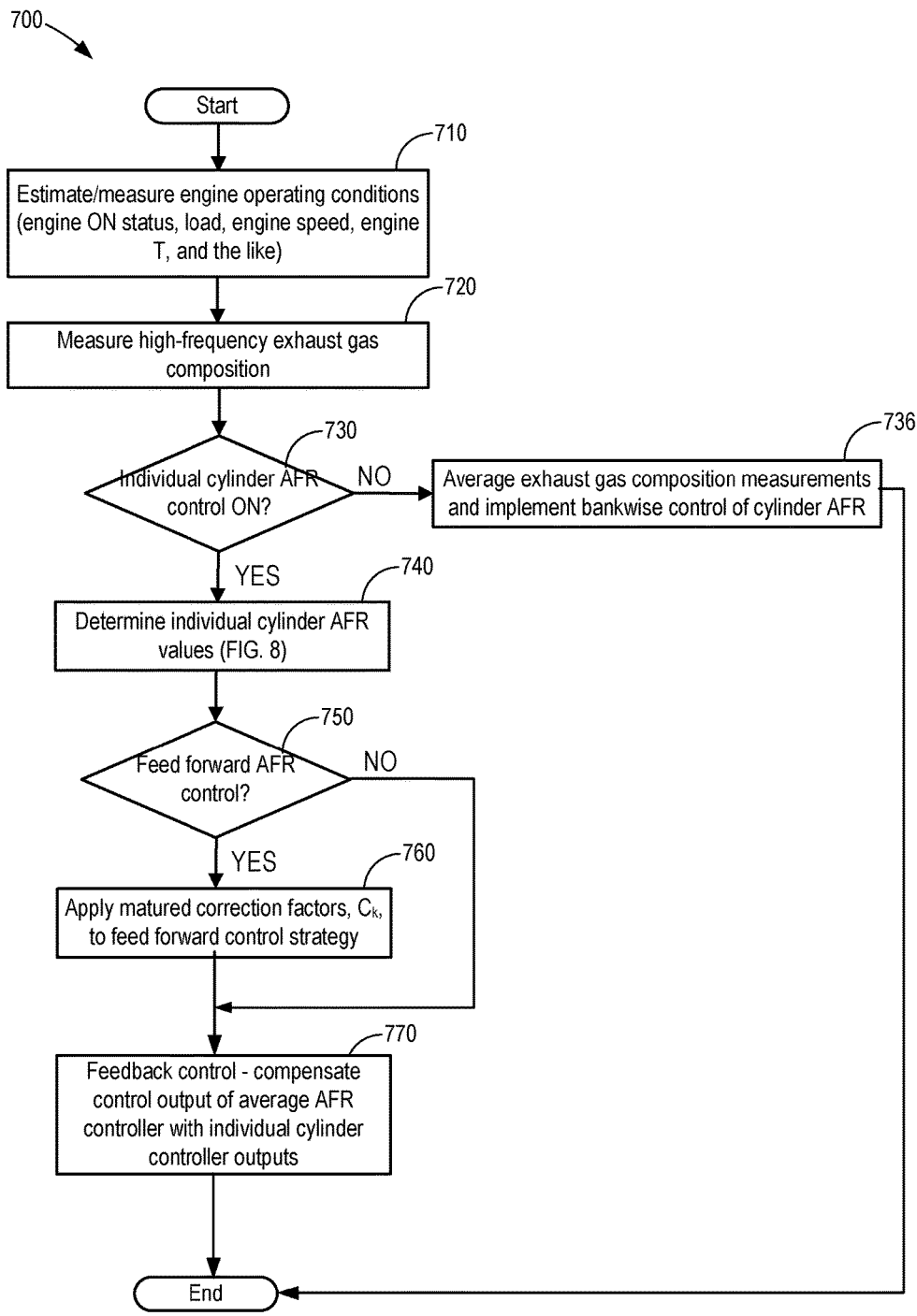
FIGS. 7 and 8 show flow charts illustrating a method of controlling AFR in individual cylinders of the engine system of FIG. 1.
Figure 8:
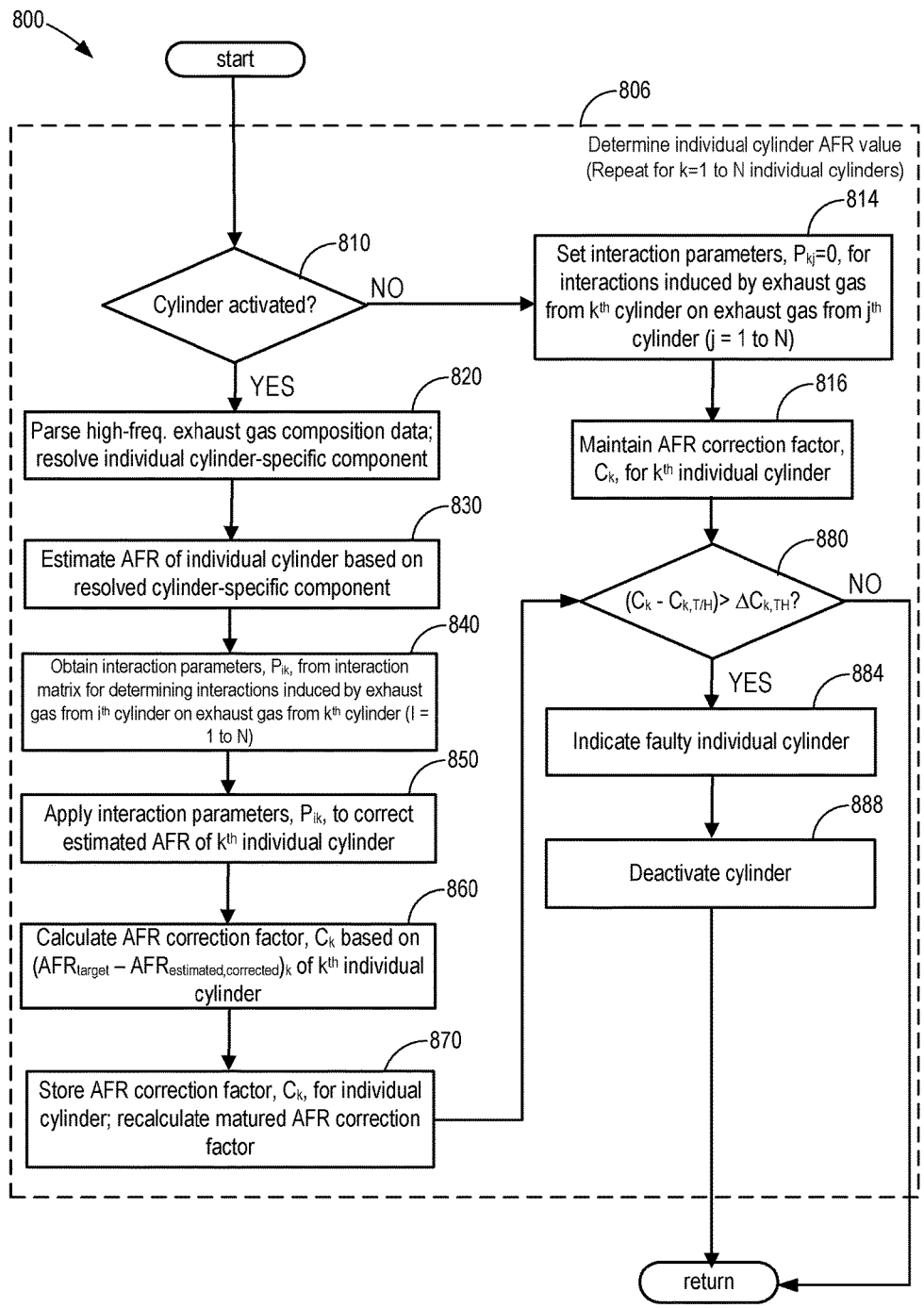

The following description relates to methods and systems for controlling AFR in individual engine cylinders during the operation of an internal combustion engine. As shown in the example embodiment of FIG. 1, an engine system may include multiple banks of cylinders, each equipped with a high-frequency exhaust gas oxygen sensor. As shown in FIG. 2, the high-frequency exhaust gas oxygen sensor measurements may be parsed to estimate AFR ratios in individual cylinders of each bank. The individual cylinder AFR estimates may be corrected by applying calibrated interaction parameters to determine the individual cylinder AFRs; furthermore, correction factors may be calculated from deviations between the individual cylinder AFRs and the target AFRs, as shown in FIGS. 7 and 8. As shown in FIG. 6, the interaction parameters and correction factors may be employed by the engine fueling control algorithm. The interaction parameters may be obtained by calibrating the engine according to the method of FIG. 9. In particular, exhaust gas oxygen measurements in individual cylinder runners may be correlated to their responses to individual cylinder fueling disturbances, as shown in FIGS. 3, 4, and 6. FIG. 10 depicts an example timing plot using the method of FIGS. 7-8 to control individual cylinder AFRs in an engine system such as the engine system of FIG. 1.

Recent advancements in engine technologies including dual port fuel injection-direct injection (PFI-DI) systems and cylinder deactivation methods employed for variable displacement engines (VDE) and rolling VDE (skip fire), allow for firing and/or deactivating one or more cylinders of an engine in response to engine torque demand; however, these methods also exacerbate AFR imbalance across individual engine cylinders and can complicate overall engine AFR control. Current engine operation methods detect AFR imbalance by measuring bank-wise (between banks of engine cylinders) differences in exhaust oxygen concentration. The exhaust oxygen concentration may be measured in each bank by an exhaust gas oxygen sensor, such as an HEGO or UEGO, positioned in the exhaust manifold of each bank of cylinders (e.g., downstream from individual exhaust runners). If the differential sensor signal exceeds a predetermined difference, then an AFR imbalance is indicated and a bank fueling correction method may applied to balance AFR for each bank of cylinders. Because the fueling correction methods are bank-wise, they only address interbank (e.g., between banks) AFR differences, and do not directly account for intrabank AFR imbalances (e.g., AFR imbalances between individual cylinders of a bank). Consequently, while bank-wise AFR differences may be balanced by the bank-wise fuel correction methods, deviations in AFR between individual cylinders in a bank (e.g., deviations from stoichiometric AFR) can persist, thereby increasing engine emissions and NVH, and reducing vehicle drivability.

TABLE 1

Bank-wise AFR cylinder balancing example scenarios

| | Cylinder no. | | | |
|---|---|---|---|---|
| | 1 | 2 | 3 | 4 |
| 1 Initial individual cylinder AFR | 0.94 | 0.98 | 1.02 | 1.01 |
| 2 Individual cylinder fuel corrections needed | 1.06 | 1.02 | 0.98 | 0.99 |
| 3 Average bank-wise AFR | | 0.9875 | | |
| 4 Bank-wise fueling correction | | 1.02 | | |
| 5 1) AFR after bank-wise correction | 0.96 | 1.00 | 1.04 | 1.03 |
| 6 1a) Average bank-wise AFR (after bank-wise fueling correction) | | 1.008 | | |
| 7 2) AFR after bank-wise correction (deactivate cylinders no. 1 and 2) | | | 1.04 | 1.03 |
| 8 2a) Average bank-wise AFR (after bank-wise fueling correction) | | 1.035 | | |

Table 1 shows two example scenarios for a four-cylinder bank that illustrate the deficiencies of bank-wise AFR balancing methods in reducing imbalance in individual cylinder AFR values. Initially, the individual cylinder AFR values range from 0.94 to 1.02, with cylinders nos. 1 and 2 operating below stoichiometry and cylinders nos. 3 and 4 operating above stoichiometry. Row 2 of Table 1 shows the individual cylinder fueling target AFRs for correcting the individual AFR values (e.g., to reduce deviations from stoichiometric AFR). Row 3 indicates a bank-wise AFR value of 0.9875, averaged across each individual cylinder. In one example, the bank-wise AFR may be measured by an exhaust gas oxygen sensor (conventional non high-frequency exhaust gas oxygen sensor) positioned downstream of individual exhaust runners in the exhaust manifold. Because the AFR balancing is performed bank-wise, the fueling correction is applied corresponding to a bank-wise AFR of 1.02 to reduce bank-wise AFR deviation from stoichiometry (e.g., correct the bank-wise average AFR of 0.9875 to an AFR of 1). In a first scenario (e.g., no cylinder deactivation), as shown in rows 5 and 6 of Table 1, although the bank-wise AFR fueling correction reduces the bank-wise average AFR to 1.008 (e.g., closer to □=1), it does not reduce the AFR variability or AFR imbalance between the individual cylinders because the bank-wise correction simply raises the AFR of each individual cylinder by approximately the same amount. In a second scenario (e.g., cylinders 1 and 2 deactivated), as shown in rows 7 and 8 of Table 1, the bank-wise correction fails to account for the deactivated cylinders. Consequently, after applying the bank-wise fuel correction, the individual cylinder AFR values of cylinders nos. 3 and 4 are raised to 1.04 and 1.03, yielding a bank-wise average AFR or 1.035. Furthermore, in the next firing cycle, where cylinders nos. 1 and 2 are reactivated, the AFR imbalance across the cylinder bank will be increased relative to their initial values (e.g., indicated in row 1 of Table 1).

Table 1 illustrates why fueling correction methods applied on a cylinder-by-cylinder basis (e.g., applied to each individual cylinder) can be advantageous in reducing individual cylinder AFR imbalance as compared to bank-wise fueling correction methods. Furthermore, because of high-frequency events such as firing of individual cylinders during engine operation, cylinder deactivation, as well as transport delays and axial/radial mixing of exhaust gas flow in exhaust runners and the exhaust manifold, the observability and measurability of accurate exhaust gas flow rates and compositions can be difficult or unresolvable by conventional exhaust gas oxygen sensors whose sampling rates may be too large (e.g., sensors having sample rates in the crank angle domain or at profile ignition pickup (PIP) or half-PIP). Furthermore, exhaust gas oxygen sensor placement can bias exhaust flow measurements from certain individual cylinders over other individual cylinders within a bank, which can cause measurement inaccuracies and introduce errors in fuel imbalance corrections and control actions taken for individual cylinders. Further still, exhaust manifolds are commonly configured to induce thorough mixing of the exhaust flows from each individual exhaust runners prior to reaching emissions control devices (e.g., three-way catalyst, and the like) to preserve catalyst efficiency and reduce emissions. Placement of an exhaust gas oxygen sensor too far downstream from the exhaust runners may hinder its ability to resolve the individual exhaust flow contributions originating from the exhaust of individual cylinders. In one example, the exhaust gas oxygen sensor may be positioned upstream of a turbine of a turbocharged engine system so as to mitigate mixing of the exhaust gases prior to measurement at the exhaust gas oxygen sensor. In this way, resolution of the individual cylinder air-fuel components of the exhaust gas may be increased.

As described herein, employing high-frequency exhaust gas oxygen sensors positioned in an exhaust manifold downstream of exhaust runners can aid in measuring and/or determining individual cylinder AFR. Furthermore, these individual cylinder AFR values can be corrected by applying predetermined interaction parameters that quantify exhaust gas flow interactions induced by neighboring cylinders within an engine cylinder bank. The predetermined interaction parameters for each bank can be estimated and/or measured by an engine calibration method, as described below. As such, an AFR control method and engine system can utilize the one or more high-frequency exhaust gas oxygen sensors and the predetermined interaction parameters for controlling and balancing individual cylinder AFR values, thereby increasing engine performance and drivability while reducing emissions and NVH as compared to conventional engine systems and methods employing bank-wise AFR balancing and control methods.

Figure 1:
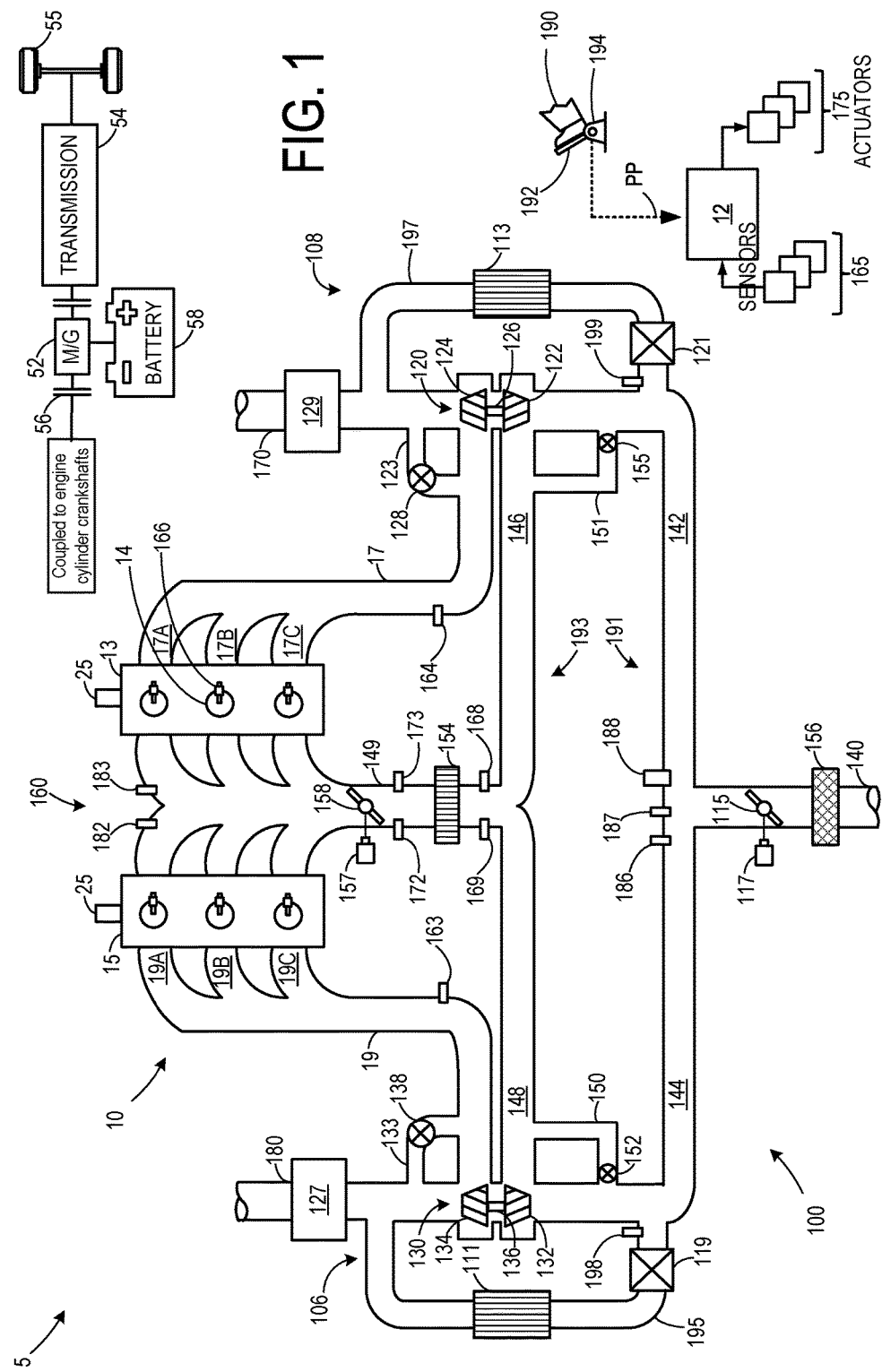
FIG. 1 shows a schematic diagram for an engine system including a high-frequency exhaust gas oxygen sensor.

Turning now to FIG. 1, it shows a schematic depiction of an example vehicle system 5 with an engine system 100 including a multi-cylinder internal combustion engine 10 with multiple banks 13 and 15 of engine cylinders. In the example of FIG. 1, the engine system 100 includes twin turbochargers 120 and 130, which may be identical. As one non-limiting example, engine system 100 can be included as part of a propulsion system for a passenger vehicle or other vehicle. While not depicted herein, other engine configurations such as an engine with a single turbocharger or without a turbocharger may be used without departing from the scope of this disclosure.

In some examples, the vehicle system 5 including engine system 100 may be a hybrid vehicle with multiple sources of torque available to one or more vehicle wheels 55. In other examples, vehicle system 5 is a conventional vehicle with only an engine 10, or an electric vehicle with only electric machine(s). In the example shown, vehicle system 5 includes engine 10 and an electric machine 52. Electric machine 52 may be a motor or a motor/generator. Crankshaft (not shown) of engine 10 and electric machine 52 are connected via a transmission 54 to vehicle wheels 55 when one or more clutches 56 are engaged. In the depicted example, a first clutch 56 is provided between the engine crankshaft and electric machine 52, and a second clutch 56 is provided between electric machine 52 and transmission 54. Controller 12 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle. Electric machine 52 receives electrical power from a traction battery 58 to provide torque to vehicle wheels 55. Electric machine 52 may also be operated as a generator to provide electrical power to charge battery 58, for example during a braking operation.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer on board a vehicle including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed. Controller 12 may be configured to receive information from a plurality of sensors 165 and to send control signals to a plurality of actuators 175 (various examples of which are described herein) to adjust engine operation based on the received signals and instructions stored on a memory of the controller. Other sensors, and actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described below and with regard to FIGS. 7-9.

Engine system 100 may receive intake air via intake passage 140. As shown in FIG. 1, intake passage 140 may include an air filter 156 and an air induction system (AIS) throttle 115. AIS throttle 115 may be configured to adjust and control an amount of low pressure exhaust gas recirculation (LP EGR) flow. The position of AIS throttle 115 may be adjusted by the control system via a throttle actuator 117 communicatively coupled to controller 12.

At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144. Accordingly, engine system 100 includes a low-pressure AIS system 191 upstream of compressors 122 and 132, and a high-pressure AIS system 193 downstream of compressors 122 and 132.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown in FIG. 1, a compressor recirculation valve (CRV) 152 may be arranged in CRV passage 150 and a CRV 155 may be arranged in CRV passage 151. In one example, CRVs 152 and 155 may be electronic pneumatic CRVs (EPCRVs). CRVs 152 and 155 may be controlled to enable release of pressure in the intake system when the engine is boosted. A first end of CRV passage 150 may be coupled with intake passage 144 upstream of compressor 132, and a second end of CRV passage 150 may be coupled with intake passage 148 downstream of compressor 132. Similarly, a first end of a CRV passage 151 may be coupled with intake passage 142 upstream of compressor 122, and second end of CRV passage 151 may be coupled with intake passage 146 downstream of compressor 122. Depending on a position of each CRV, air compressed by the corresponding compressor may be recirculated into the intake passage upstream of the compressor (e.g., intake passage 144 for compressor 132 and intake passage 142 for compressor 122). For example, CRV 152 may open to recirculate compressed air upstream of compressor 132 and/or CRV 155 may open to recirculate compressed air upstream of compressor 122 to release pressure in the intake system during selected conditions to reduce the effects of compressor surge loading. CRVs 155 and 152 may be passively controlled, or actively controlled by the control system.

As shown, a low-pressure (LP) AIS pressure sensor 186 is arranged at a juncture of intake passages 140, 142, and 144, and a high-pressure (HP) AIS pressure sensor 169 is arranged in intake passage 149. However, in other anticipated embodiments, sensors 186 and 169 may be arranged at other locations within the LP AIS and HP AIS, respectively. Among other functions, measurements from LP AIS pressure sensor 186 and HP AIS pressure sensor 169 may be used to determine compressor pressure ratio, which may in factor into an estimate of compressor surge risk.

Engine 10 may include a plurality of cylinders 14. Each of the cylinders may be formed by cylinder walls with a piston (not shown) positioned therein. The piston may be coupled to an engine crankshaft (not shown) so that reciprocating motion of the piston is translated into rotational motion of the crankshaft. The crankshaft may be coupled to at least one drive wheel 55 of a vehicle system 5 via an intermediate transmission 54. Further, a starter motor may be coupled to the crankshaft via a flywheel to enable a starting operation of the engine 10. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate banked configurations, such as V, in-line, boxed, etc. Each cylinder 14 in each of the banks 13 and 15 may be configured with a fuel injector 166. In the depicted example, fuel injector 166 is a direct in-cylinder injector. However, in other examples, fuel injector 166 can be configured as a port based fuel injector. In some examples, both port based and direct in-cylinder injectors may be coupled to the same engine cylinder.

Intake air supplied to each cylinder 14 (herein, also referred to as combustion chamber 14) via common intake passage 149 may be used for fuel combustion and products of combustion may then be exhausted from cylinder-specific exhaust runners feeding bank-specific exhaust passages. In the depicted example, a first bank 13 of cylinders of engine 10 can exhaust products of combustion via exhaust runners 17A, 17B, and 17C, feeding a common exhaust passage 17 and a second bank 15 of cylinders can exhaust products of combustion via exhaust runners 19A, 19B, and 19C, feeding a common exhaust passage 19. Exhaust gas oxygen sensors 163 and 164 may be positioned downstream of the exhaust runners 17A-C and 19A-C, respectively, in common exhaust passages 17 and 19, respectively. In one example, the high frequency exhaust gas oxygen sensor may be positioned upstream of a turbine 124 or 134 of a turbocharged engine to mitigate mixing of the exhaust gas prior to measurement thereof at the exhaust gas oxygen sensor and to increase resolution of the individual cylinder air-fuel components thereof. Exhaust passages 17 and 19 may also be referred to herein as exhaust manifolds 17 and 19. In this way, the exhaust runners 17A-C and 19A-C fluidly couple cylinders 14 in each bank (13 and 15) to the exhaust manifolds 17 and 19, respectively. Furthermore, the exhaust gas oxygen sensors 163 and 164 may be fluidly coupled to the exhaust manifolds 17 and 19. Exhaust gas oxygen sensors 163 and 164 may measure oxygen content, flow rate, and or AFR of the exhaust gas in exhaust manifolds 17 and 19. As such, the exhaust gas oxygen sensors 163 and 164 may measure aggregate (e.g., overall, combined) oxygen content, flow rate, and or AFR of the exhaust gas expelled from cylinders in the bank upstream and fluidly coupled to the common exhaust manifold 17 or 19.

Exhaust gas oxygen sensors 163 and 164 may include high frequency exhaust gas oxygen sensors for measuring exhaust gas flow, exhaust gas composition, exhaust gas oxygen content, and other exhaust gas flow and/or composition characteristics. The high frequency exhaust gas oxygen sensors 163 and 164 have a response from 1 kHz to 40 kHz. The controller 12 may detect the signals from the high frequency exhaust gas oxygen sensors 163 and 164 at sampling rates shorter than a threshold sampling rate in order to estimate bank-wise and individual cylinder gas properties, including AFR. The threshold sampling rate may be less than a PIP-based sampling rate; for example, the threshold sampling rate may be less than 1 ms. For example, the threshold sampling rate may be 0.66 ms. When the sample rate of the exhaust gas oxygen sensors 163 and 164 is less than the threshold sampling rate, an accuracy of binning (or parsing) the exhaust gas flow signals and estimating the exhaust gas flows originating from individual cylinders can be increased since the amount of data points sampled within a given time interval is increased. Herein, exhaust gas flows (e.g., from measurements from exhaust gas oxygen sensors 163 and 164, from measurements from exhaust gas oxygen sensors 212, 214, 216) is understood to include exhaust gas AFR, exhaust gas oxygen content, and exhaust gas flow rate data. Similarly, estimating the exhaust gas flows originating from individual cylinders is understood to include estimating the exhaust gas AFR, exhaust gas oxygen content, and exhaust gas flow rate originating from individual cylinders. In another example, the engine system 100 may further include high-frequency exhaust oxygen sensors in each exhaust runner, such that the exhaust flows in each exhaust runner may be directly measured.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Products of combustion that are exhausted by the individual cylinders of bank 13 of engine 10 via exhaust runners 17A, 17B, and 17C, and exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by the individual cylinders of bank 15 of engine 10 via exhaust runners 19A, 19B, and 19C, and exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may modulate between air pressures in intake passage 144 arranged upstream of compressor 132 and intake passage 149 arranged downstream of compressor 132 for facilitating the actuation of wastegate 138 via the actuator. In other examples, other suitable approaches other than a solenoid valve may be used for actuating wastegate 138.

Products of combustion exhausted by the cylinders via exhaust passage 17 may be directed to the atmosphere via exhaust passage 170 downstream of turbine 124, while combustion products exhausted via exhaust passage 19 may be directed to the atmosphere via exhaust passage 180 downstream of turbine 134. Exhaust passages 170 and 180 may include one or more exhaust after-treatment devices, such as a catalyst, and one or more exhaust gas sensors. For example, as shown in FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically reset by operating at least one cylinder of the engine within a particular air/fuel ratio, for example.

Engine system 100 further includes low-pressure (LP) EGR systems 106 and 108. LP EGR system 106 routes a desired portion of exhaust gas from exhaust passage 180 to intake passage 144, whereas LP EGR system 108 routes a desired portion of exhaust gas from exhaust passage 170 to intake passage 142. In the depicted embodiment, EGR is routed in an EGR passage 195 from downstream of turbine 134 to intake passage 144 at a mixing point located upstream of compressor 132. Similarly, EGR is routed in an EGR passage 197 from downstream of turbine 124 to intake passage 142 at a mixing point located upstream of compressor 122. The amount of EGR provided to intake passages 144 and 142 may be varied by the controller 12 via EGR valves 119 and 121 coupled in the LP EGR systems 106 and 108, respectively. In the example embodiment shown in FIG. 1, LP EGR system 106 includes an EGR cooler 111 positioned upstream of EGR valve 119, and LP EGR system 108 includes an EGR cooler 113 positioned upstream of EGR valve 121. EGR coolers 111 and 113 may reject heat from the recirculated exhaust gas to engine coolant, for example.

The EGR dilution percentage of the intake charge at a given time (e.g., the proportion of combusted gases to air in an intake passage of the engine) may be inferred from the output of an intake oxygen sensor 168. In the depicted embodiment, the intake oxygen sensor is positioned at a juncture of intake passages 146, 148, and 149 and upstream of air cooler 154. However, in other embodiments, sensor 168 may be arranged downstream of air cooler 154, or at another location along intake passage 149. Intake oxygen sensor 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 119, EGR valve 121, AIS throttle 115, CRV 152, CRV 155, wastegate 138, and wastegate 128 to achieve a desired EGR dilution percentage of the intake charge.

It will be appreciated that in alternative embodiments, engine 10 may include one or more high pressure (HP) EGR systems as well as the LP EGR systems, to divert at least some exhaust gas from the engine exhaust passages, upstream of the turbines, to the engine intake, downstream of the compressors.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Low pressure AIS system 191 may include temperature sensor 187 and/or humidity sensor 188. EGR passage 195 may include temperature sensor 198. Similarly, EGR passage 197 may include temperature sensor 199. Further, while not depicted herein, each of intake passages 142 and 144 can include a mass air flow sensor. Furthermore, while not depicted herein, engine system 100 may include an engine position sensor from a Hall effect sensor sensing crankshaft position.

Turning now to FIG. 2, it illustrates a schematic diagram of a partial exhaust system 200, including exhaust runners 19A, 19B, and 19C, exhaust gas flow 219A, 219B, and 219C, therein, respectively. Exhaust gas flow 219-C from the exhaust runners 19A-C flows downstream and merges into an aggregate exhaust gas flow 219 in common exhaust manifold 19. Data plot 220 represents the flow of exhaust gas 219A, 219B, and 219C measured by exhaust gas oxygen sensors 212, 214, and 216, each positioned in separate individual exhaust runners, such as exhaust runners 19A, 19B, and 19C, respectively (as indicated by block arrows 202, 204, and 206). Data plot 260 represents an aggregate flow of exhaust gas 219 (from exhaust runners 219A, 219B, and 219C) measured by an exhaust gas oxygen sensor 263 positioned downstream of the exhaust runners in an exhaust manifold 19, as indicated by block arrow 208. The aggregate flow of exhaust gas 219 may include the combined aggregate flow of exhaust gas from exhaust runners from the each cylinder of the cylinder bank. In the example of FIG. 2, exhaust gas oxygen sensors 212, 214, 216, and 260 may include high-frequency exhaust gas oxygen sensors, and may transmit high frequency signals indicating exhaust gas flow and/or exhaust gas oxygen concentrations to controller 12. The exhaust gas flows in exhaust runners 17A-C and exhaust manifold 17 can be analogously measured and characterized.

Data plot 220 illustrates exhaust gas flow measured following multiple firings of cylinders no. 2, no. 4, and no. 6 of a bank of a 6-cylinder combustion engine, such as engine system 100 of FIG. 1. Data plot 220 illustrates six sequential cylinder firing events of two firing cycle periods, $T_c$; during each of the firing cycles, each of the three cylinders of the bank are fired in sequence, as indicated by the signals 222, 224, and 226 for the first firing cycle, and by the signals 232, 234, and 236 for the second firing cycle. In the example of plot 220, cylinder no. 2 is first fired, followed by cylinder no. 4, followed by cylinder no. 6 for each of the firing cycles. A firing interval, $T_s$, for each cylinder may be indicated by the peak to peak distances between exhaust gas flow profiles of successive cylinder firing events. Accordingly, each cylinder firing event may be marked as occurring at a periodic time during the firing interval (e.g., duration) $T_s$ for each cylinder firing, such as at peak exhaust gas flow. As shown in the partial exhaust system 200, exhaust gas flows 222 and 232 result from firings of cylinder no. 2, exhaust gas flows 224 and 234 result from firings of cylinder no. 4, and exhaust gas flows 226 and 236 result from firings of cylinder no. 6. Timing of cylinder firing events may further correspond to specific crankshaft angles, timing, and/or positions, as indicated by a crankshaft position sensor. The signals 222, 224, 226, 232, 234, and 236 may further represent filtered sensor signals transmitted to the controller 12.

Data plot 260 illustrates the exhaust gas flow measured by exhaust gas sensor 263 positioned in exhaust manifold 19 downstream of the exhaust runners 19A, 19B, and 19C. In other words, referring to data plots 260 and 220, the exhaust gas flow signal 262 as measured by exhaust gas flow sensor 263 may represent an aggregate of the exhaust flows in the exhaust runners of the cylinder bank indicated by signals 222, 224, 226, 232, 234, and 236. In some examples, no filtering of the high frequency exhaust gas measurements is performed so as to avoid reducing firing detail and resolution of the individual cylinder components thereof. Resolution of the individual cylinder components may be attained by averaging the high frequency exhaust gas measurement data corresponding to the individual cylinder cycle times based on engine rpm time-based criteria. As previously mentioned with reference to data plot 220, individual cylinder firing events (as labeled 1 through 6) may coincide with peak exhaust gas flows (e.g., peak signals measured by exhaust gas oxygen sensor 263), or may be indicated by particular crankshaft timing events corresponding to individual cylinder firings.

The duration of each individual cylinder firing interval, $T_s$, may be determined by the period between individual firing events. Furthermore, the firing cycle period, $T_c$, may correspond to a duration of sequential firings of each cylinder in the bank. Thus, the exhaust gas flow signal 262 may be divided into firing cycle intervals, $T_c$, and each firing cycle can further be subdivided into exhaust gas flows corresponding to sequential firing events of individual cylinders (e.g., no. 2, no. 4, no. 6) in the bank. In this way, the controller 12 may parse the exhaust gas flow signal 262 to break down the aggregate exhaust gas flow into individual cylinder exhaust gas flows to estimate the exhaust gas flow (e.g., exhaust gas oxygen flow, exhaust gas oxygen content, exhaust gas AFR) originating from individual cylinders.

In one example, when an exhaust gas flow corresponding to an individual cylinder measured by the exhaust gas sensor 263 is greater than a threshold exhaust flow 268, the controller 12 may determine a cylinder to be active. In this way, the exhaust gas flow sensor 263 may also aid in detecting deactivated cylinders which can reduce errors in AFR control and fueling of individual cylinders. In another example, when an exhaust gas oxygen content corresponding to an individual cylinder measured by the exhaust gas oxygen sensor 263 is greater than an upper threshold oxygen content, the controller 12 may determine that the cylinder is inactive (e.g., non-firing). As an example, the upper threshold oxygen content may be between 15% and 20%. For example, the upper threshold oxygen content may be 18%. In another example, when an exhaust gas air-to-fuel ratio corresponding to an individual cylinder measured by the exhaust gas oxygen sensor 263 is greater than an upper threshold air-to-fuel ratio, the controller 12 may determine that the cylinder is inactive (e.g., non-firing). As an example, the upper threshold air-to-fuel ratio may be greater than 40:1. In another example, the upper threshold air-to-fuel ratio may be 50:1.

In another example, when an exhaust gas oxygen content corresponding to an individual cylinder measured by the exhaust gas oxygen sensor 263 is within a medium threshold oxygen content range, the controller 12 may determine that the cylinder is misfiring. A cylinder misfiring may correspond to a cylinder that has been fueling but has not fired completely. For example, the medium threshold oxygen content range may be from 5 to 15% or from 5 to 8%. In another example, when an exhaust gas air-to-fuel ratio corresponding to an individual cylinder measured by the exhaust gas oxygen sensor 263 is within a medium threshold gas air-to-fuel ratio range, the controller 12 may determine that the cylinder is misfiring. For example, the medium threshold air-to-fuel range may be from 20:1 to 50:1. As another example, the medium threshold air-to-fuel range may be from 20:1 to 40:1.

Turning now to FIGS. 3 and 4, they illustrate exhaust gas flows (e.g., cylinder runner exhaust oxygen concentration) 310, 320, 330, 340, 350, 360, 370, and 380 measured in separate individual cylinder exhaust runners of an 8 cylinder combustion engine with elapsed time. Exhaust gas flows of individual cylinder exhaust runners may be measured by exhaust gas oxygen sensors positioned in each individual exhaust runner, as shown in the partial exhaust system 200. FIG. 3 shows the measured cylinder exhaust oxygen concentration originating from each cylinder superimposed on a single plot, while FIG. 4 displays the exhaust oxygen concentration originating from separate cylinder exhaust runners on separate axes, for clarity. During the time period plotted in FIGS. 3 and 4, the exhaust oxygen concentration is pulsed (e.g., lean AFR) at each cylinder, one at a time over a pulse interval 390, over of eight sequential pulse interval periods. For example, the fuel injection for cylinder no. 1 is pulsed lean-wise during pulse interval 1 while the fuel injection for the other cylinders is maintained. Similarly, cylinder no. 2 is pulsed during pulse interval 2, cylinder 3 is pulsed during pulse interval 3, cylinder no. 4 is pulsed during pulse interval 4, cylinder no. 5 is pulsed during pulse interval 5, cylinder no. 6 is pulsed during pulse interval 6, cylinder 7 is pulsed during pulse interval 7, and cylinder no. 8 is pulsed during pulse interval 8, each one at a time.

As evidenced by FIGS. 3 and 4, exhaust flow in an individual cylinder runner can cause disturbances in other cylinder runners. For example, when the exhaust flow in the exhaust runner of cylinder no. 1 pulses during the first interval, exhaust flow disturbances 322 and 346 are detected in exhaust runners from cylinder no. 2 and cylinder no. 4, respectively. Similarly, when exhaust flow in exhaust runner of cylinder no. 2 pulses during interval 2, exhaust flow disturbances 344 are detected in exhaust runner 4. Furthermore, when the exhaust flow in the exhaust runner of cylinder no. 6 pulses during the sixth interval, exhaust flow disturbances 352 and 384 are detected in exhaust runners from cylinder no. 5 and cylinder no. 8, respectively. The exhaust flow disturbances shown in exhaust runners other than the exhaust runner where the originating the exhaust flow pulse occurs may arise due to exhaust flow interactions between individual cylinders (e.g., intercylinder interactions). Accordingly exhaust flows measured by a high-frequency exhaust gas sensor positioned in an exhaust runner may include the exhaust flow originating from the cylinder fluidly coupled upstream to the exhaust runner as well as contributions (e.g., intercylinder interactions) arising from exhaust flows originating from other cylinders fluidly coupled to other exhaust runners.

These intercylinder interactions may be caused by back mixing and or back flow of exhaust gases from the exhaust manifold (into which the exhaust runners commonly feed) in an upstream direction back into individual exhaust runners. The number and magnitude of intercylinder interactions may depend on exhaust gas flow rates in the individual exhaust runners, the shape and dimensions of the exhaust runners, and the shape and dimensions of the exhaust manifold. For example, higher exhaust gas flow in an exhaust runner may increase back mixing of exhaust gases from the exhaust manifold to other exhaust runners. Furthermore, the amount of intercylinder interactions may increase with the number of cylinders in a bank or engine (e.g., number of exhaust runners). The orientation and geometry of the merging region of the exhaust runners with the exhaust manifold can also influence back flow and/or back mixing of exhaust gases from the exhaust manifold upstream to the exhaust runners. As another example, intercylinder interactions may increase between exhaust runners that are adjacently positioned at their merging points with the exhaust manifold. For example, in the example of engine system 100 of FIG. 1, intercylinder interactions between exhaust runner 19A and 19B may be greater than those between 19A and 19C.

Exhaust intercylinder interactions may increase (or decrease) when an engine system operation includes a non-firing cylinder or a misfiring cylinder. An exhaust pressure pulse resulting from a non-firing cylinder may be different from an exhaust pressure pulse resulting from that same cylinder in firing mode; thus, an amount of intercylinder exhaust gas mixing may be different, leading to different intercylinder interactions. Similarly, an exhaust pressure pulse resulting from a misfiring cylinder may be different from an exhaust pressure pulse resulting from that same cylinder in firing (or non-firing) mode due to the lower exhaust pressure generated by the misfiring cylinder and the increased presence of uncombusted and evaporated fuel hydrocarbons in the cylinder exhaust mixture. Consequently, determining the exhaust intercylinder interactions can aid in evaluating when and if individual cylinders may be non-firing (inactive), misfiring, or firing (active).

Figure 5:
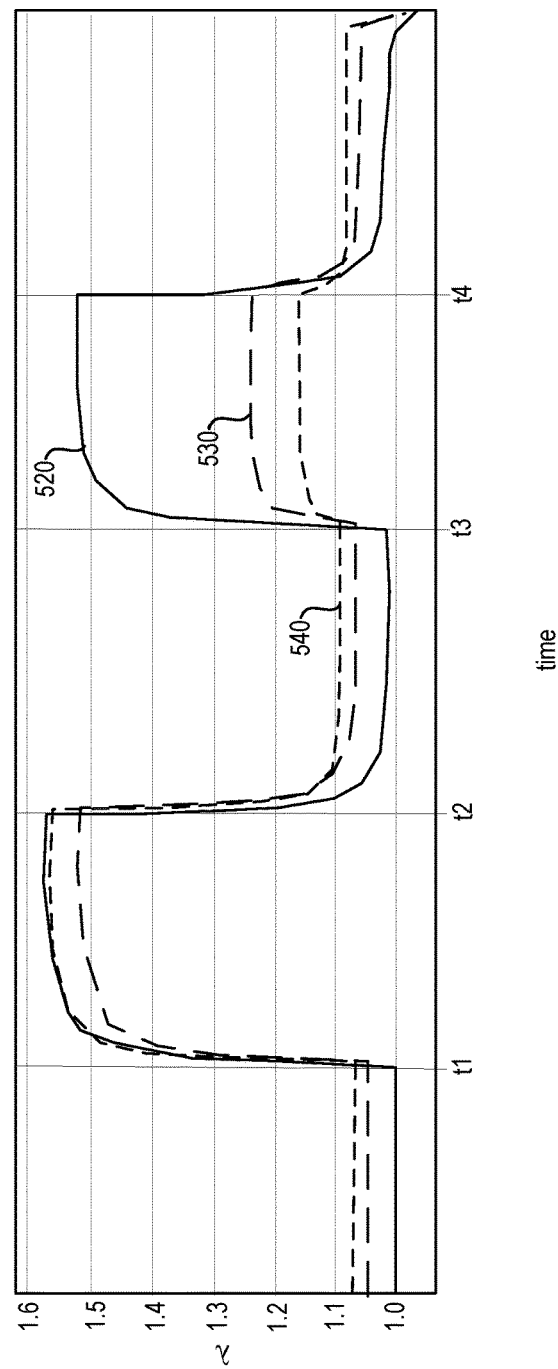
FIG. 5 shows a plot illustrating engine data generated for calibration of exhaust gas interaction parameters between individual cylinders.
Figure 9:
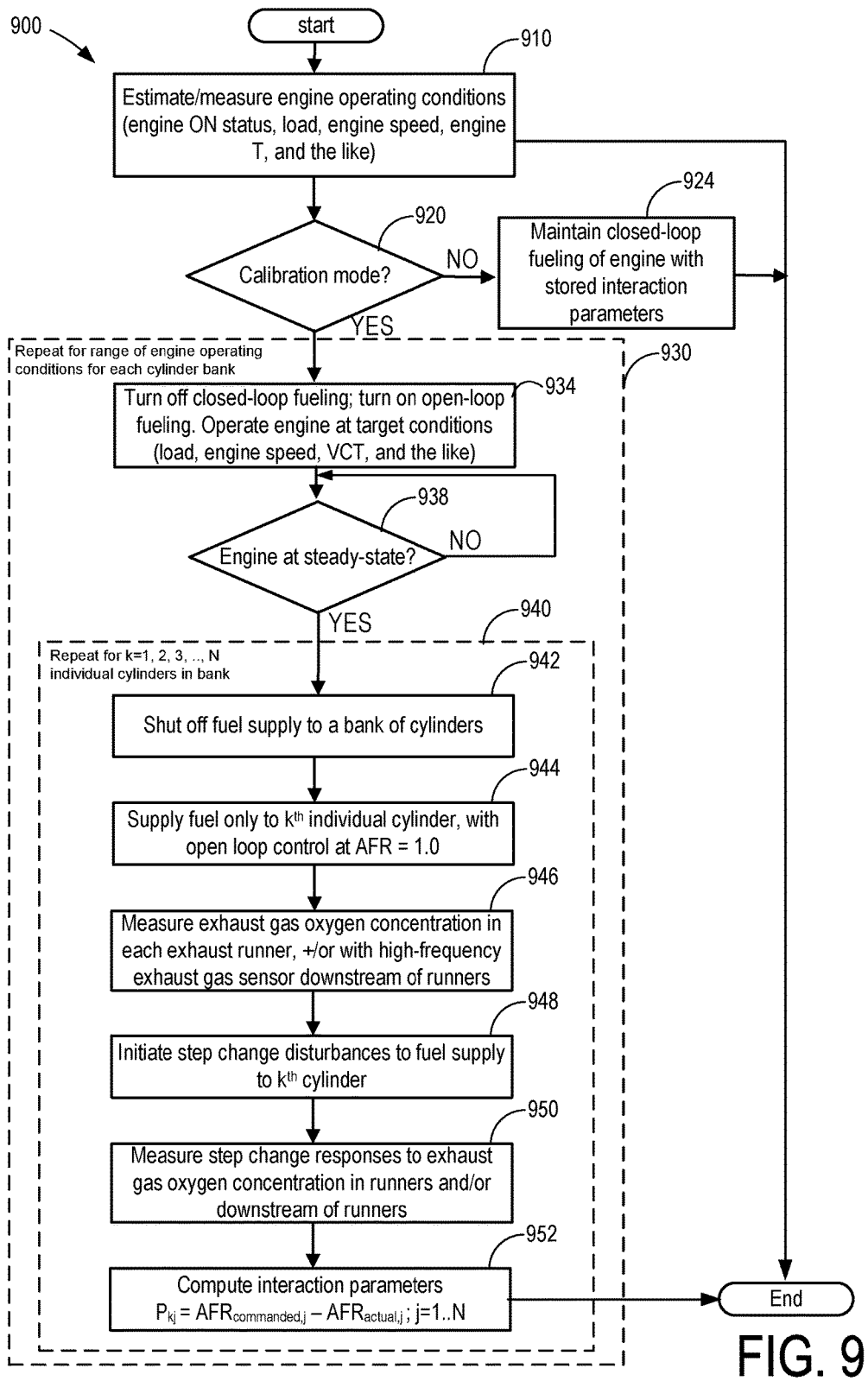
FIG. 9 shows a high level flow chart illustrating a method for calibrating exhaust gas interaction parameters between individual cylinders.
Figure 10:
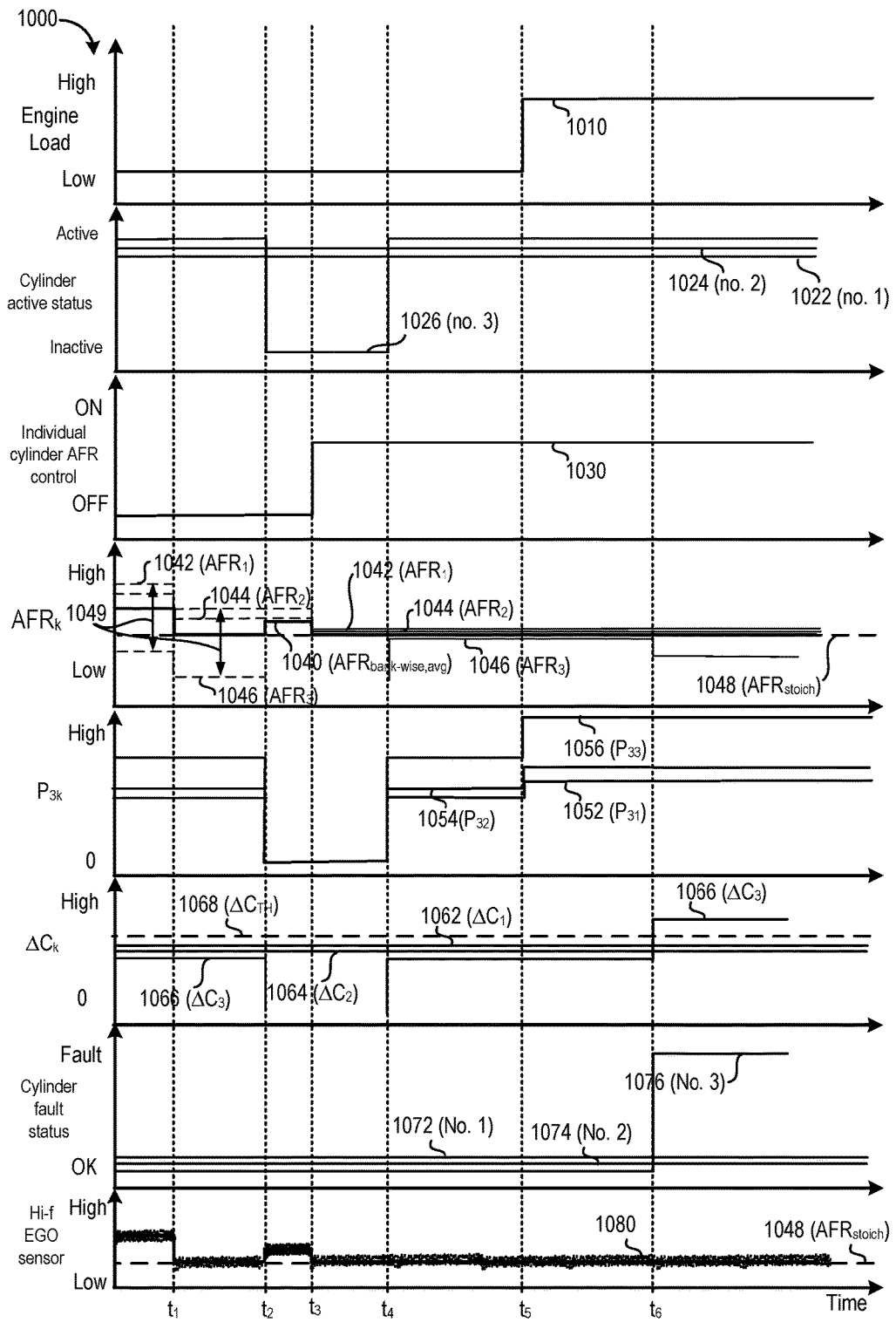
FIG. 10 shows an example timing plot for the operation of an engine system 100 using the method depicted in FIGS. 7 and 8.

Calibration of the engine system may be performed to characterize intercylinder interactions, as shown in FIGS. 5 and 9. The calibration method may learn and populate a matrix of interaction parameters (e.g., cross-correlation coefficients) between individual cylinders. The matrix of interaction parameters may include an N×N matrix, a, where N is the number of individual cylinders in a bank of the combustion engine. Each $n_{ij}$ element of the N×N matrix (where i=1 to N; j=1 to N) corresponds to the interaction induced by exhaust flow originating from the $i^{th}$ cylinder (e.g., exhaust flow in the $i^{th}$ exhaust runner) on to exhaust flow measured at the $j^{th}$ exhaust runner. As an example, for an eight-cylinder engine's two bank of 4-cylinders, the interaction matrices, $\alpha_1$ and $\alpha_2$, may be represented by equations (1) and (2):

Interaction matrix(bank 1), Equation 1

$$\alpha_1 = \begin{bmatrix} n_{11} & n_{12} & n_{13} & n_{14} \\ n_{21} & n_{22} & n_{23} & n_{24} \\ n_{31} & n_{32} & n_{33} & n_{34} \\ n_{41} & n_{42} & n_{43} & n_{44} \end{bmatrix} = f(\text{engine conditions})$$

-continued

Interaction matrix(bank 2), Equation 2

$$\alpha_2 = \begin{bmatrix} n_{11} & n_{12} & n_{13} & n_{14} \\ n_{21} & n_{22} & n_{23} & n_{24} \\ n_{31} & n_{32} & n_{33} & n_{34} \\ n_{41} & n_{42} & n_{43} & n_{44} \end{bmatrix} = f(\text{engine conditions})$$

In order to calibrate and measure the interaction parameters, an engine exhaust system may be instrumented by positioning a high-frequency exhaust gas oxygen sensor in each exhaust runner, as shown in the partial exhaust system 200, and as described above. The exhaust gas oxygen sensors in each exhaust runner may include flame ionization detectors (FIDs) and/or other high-frequency exhaust gas oxygen sensors, including high-frequency UEGO sensors. Furthermore, as shown in equations (1) and (2), the interaction parameters may depend on the engine operating conditions such as engine load and engine speed. Thus, the calibration method may be performed across a broad range of engine operating conditions (e.g., engine loads, engine speeds, engine VCTs, and the like) so that interaction parameters can be determined as a function of these engine operating conditions. As such calibration of the engine system may include populating a set of interaction matrices, each matrix of the set corresponding to a particular range of engine operating conditions. For example, a plurality of interaction matrices may be calibrated corresponding to a range of engine speeds at constant load; a second plurality of interaction matrices may be calibrated corresponding to the same range of engine speeds at a second higher constant load; and so forth for varying engine speeds, engine loads, VCTs, and the like. In one embodiment, the exhaust gas oxygen sensors in each exhaust runner may be utilized only for calibrating the engine system and may be removed prior to installation of the engine system in a new vehicle. In other embodiments, the engine system 100 may be instrumented with exhaust gas oxygen sensors in each exhaust runner so that interaction parameters may be recalibrated throughout the life of the vehicle.

Turning now to FIG. 9, it illustrates an example flow chart of a method 900 for calibrating the engine system to determine the matrix of interaction parameters. Instructions for carrying out method 900 and the rest of the methods included herein may be executed by a controller 12 based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below. Method 900 begins at 910 where the engine operating conditions such as engine ON status, load, engine speed, engine temperature, and the like are estimated and/or measured. At 920, method 900 determines if calibration mode is selected. In one example, the calibration mode may be selected during a pre-installation period prior to installation of the engine in a new vehicle. During the pre-installation period, the engine may be equipped with high-frequency exhaust oxygen sensors positioned in each exhaust runner so that the interactions between individual cylinders in an engine bank may be accurately measured. Furthermore, a high-frequency exhaust gas oxygen sensor may be positioned in the exhaust manifold downstream of the convergence point where the exhaust runners merge into the common exhaust manifold. Exhaust gas measurements made by the high-frequency exhaust gas oxygen sensor positioned downstream from the exhaust runners can be correlated to the measurements from the sensors positioned in each runner during the calibration. In this way, parsing or binning of the composite exhaust flow measured by the high-frequency exhaust gas sensor positioned in the exhaust manifold downstream from the exhaust runners can be facilitated, thereby enabling inferring of the individual cylinder exhaust flow rates upon which accurate estimates of the individual cylinder AFRs can be based. Following the pre-installation period, the high-frequency exhaust oxygen sensors positioned in each exhaust runner may be removed, while maintaining the high-frequency exhaust oxygen sensor positioned downstream from the exhaust runners in the exhaust manifold, thereby reducing manufacturing costs and complexity of the engine system. In another example, the engine system having high-frequency exhaust oxygen sensors in each exhaust runner may be installed in a vehicle, such that the vehicle's engine may be periodically calibrated (or recalibrated) to update the interaction parameters. For example, the engine may be recalibrated to update interaction parameters during regular vehicle service appointments. In this way, AFR imbalance between individual cylinders can be reduced, thereby maintaining vehicle drivability while reducing engine emissions and NVH.

At 920, for the case where calibration mode is not selected, method 900 continues at 924 where the controller 12 maintains closed-loop fueling of the engine, including bank-wise and/or individual cylinder AFR control with stored interaction parameters. For the case where the calibration mode is selected, method 900 continues to 930, where the controller 12 repeats calibration of the engine system 100 (steps 934 through 952) over a range of engine operating conditions for each cylinder bank. At 934, the controller 12 continues executing method 900 by stopping closed-loop fueling of the engine, starting open-loop fueling of the engine, and by operating the engine at a set of target operating conditions (e.g., engine load, engine speed, VCT, and the like). Operating the engine in open-loop mode with respect to fueling allows for direct measurement of the intercylinder interaction parameters without interference from fueling corrections initiated by closed-loop fueling control methods. Next, method 900 continues at 938 where the controller 12 determines if the engine is operating at steady-state with respect to the set of target operating conditions selected at 934. The engine may be determined to be operating at steady-state when a deviation of each of the engine operating conditions (e.g., load, engine speed, VCT, and the like) from the target engine operating conditions set at 934 is less than a threshold steady-state deviation for more than a threshold steady-state duration. If steady-state has not been reached, method 900 continues at 938. When steady-state conditions have been reached at 938, method 900 continues at 940, where the calibration of interaction parameters (steps 942 through 952) is performed with respect to each individual $k^{th}$ cylinder in the bank of cylinders (e.g., k=1 to N cylinders).

Continuing with method 900 at 942, the controller 12 shuts off the fuel supply to the bank of cylinders 942. Next, at 944, the controller 12 supplies fuel only to the $k^{th}$ individual cylinder, with open loop control at a target AFR of 1.0 (e.g., stoichiometric operation). Accordingly, fuel (and air) are supplied to the $k^{th}$ cylinder corresponding to an AFR of 1.0 within the $k^{th}$ cylinder. While supplying fuel only to the $k^{th}$ cylinder at 944, the remaining cylinders of the bank are pumping air (e.g., no combustion within the cylinder). As one example, in a bank of four cylinders of an eight-cylinder engine, the controller 12 may first operate open-loop fueling for cylinder 1 at AFR of 1.0 while fuel is shut-off to cylinders 2, 3, and 4. The next time 940 (including steps 942 through 952) is executed the controller 12 may operate open-loop fueling for cylinder 2 at AFR of 1.0 while fuel is shut-off to cylinders 1, 3, and 4, and so on.

Next, method 900 continues at 946 where the controller 12 measures the exhaust gas flow (flow rate, oxygen content, composition, and the like) in each exhaust runner and/or downstream from the exhaust runners with one or more high-frequency exhaust gas oxygen sensors. As described above exhaust gas oxygen sensors may be positioned in each exhaust runner to directly measure the exhaust gas flows therein. Alternately or additionally, the exhaust gas flows in each exhaust runner may be inferred and/or estimated from parsing (e.g., breaking down into its components) a composite exhaust gas oxygen flow measured by an exhaust gas oxygen sensor positioned downstream from the exhaust runners.

Method 900 continues at 948 where the controller 12 initiates a step change disturbance to the fuel supply to the $k^{th}$ cylinder. The step change disturbance can include one or more of a variance in fuel supply and/or air intake to the $k^{th}$ cylinder to initiate a disturbance in the AFR of the $k^{th}$ cylinder above a threshold AFR disturbance. The threshold AFR disturbance may also include a disturbance duration maintained beyond a threshold disturbance duration. The threshold AFR disturbance may correspond to a change in the AFR above which interactions induced by the exhaust gas flow from the $k^{th}$ cylinder on exhaust gas flows of the other bank cylinders can be detected and accurately measured.

Next, method 900 continues at 950 where the controller again measures the exhaust gas flow (flow rate, oxygen content, composition, and the like) in each exhaust runner and/or downstream from the exhaust runners with one or more high-frequency exhaust gas oxygen sensors. At 950, the measured exhaust gas flows correspond to the responses of the exhaust gas flows in each exhaust runner to the step change disturbance initiated at 948. Following 950, method 900 continues at 952 where the controller 12 computes the interaction parameters, $P_{kj}$, according to equation (3):

$$P_{kj}=AFR_{commanded,k}=AFR_{actual,j}; j,k=1 \text{ to } N \qquad \text{Equation 3}$$

In other words, the interaction parameter, $P_{ij}$, describes the deviation between the commanded AFR (e.g., open loop set point) for the $k^{th}$ cylinder and the actual AFR for the $j^{th}$ cylinder. As described above, the $AFR_{actual,j}$ may be measured and/or inferred from high-frequency exhaust gas sensors positioned in each exhaust runner and/or a high-frequency exhaust gas oxygen sensor positioned downstream of the exhaust runners of the cylinder bank.

As described previously, 940 (including 942 through 952) are repeated for k=1 through N to determine the interaction parameters $P_{ij}$ induced by the $k^{th}$ cylinder upon each individual cylinder of the bank. Furthermore, 930 (including 934 through 952) are repeated for each set of engine operating conditions (e.g., engine load, speed, VCT, and the like), thereby generating an N×N interaction parameter matrix for each set of engine operating conditions. By repeating the calibration method over a broad range of engine operating conditions, highly non-linear gas mixing dynamics and interactions within the exhaust runners and exhaust manifold can be captured in the individual cylinder AFR control scheme. Furthermore, the controller 12 may employ parameterized models or look-up table approaches such as computational fluid dynamics (CFD) models or gain-scheduled look-up table values with gains for interaction parameters being a function of engine operating conditions to extend the estimation of interaction parameters to a broader range of engine operating conditions. In one example, the intercylinder interactions (and the corresponding interaction parameters) may be higher at higher engine loads because engine cylinder exhaust pressures and flow rates may be higher. In another example, the intercylinder interactions may be lower at lower engine rpm conditions because the exhaust pressure pulses originating from the individual cylinders may be more separated in time as compared to higher engine rpm conditions. In another example, cylinder interactions may be higher between exhaust gases originating from paired engine exhaust runners. For example, in a V8 engine, the engine exhaust runners corresponding to cylinders 1 and 2 may be paired; thus intercylinder interactions between exhaust runners corresponding to cylinders 1 and 2 may be higher. Returning to method 900 after 924, and following 952, method 900 ends.

Turning now to FIG. 5, it illustrates a plot 500 of trend lines illustrating an engine calibration method to determine interaction parameters according to the method 900. Trend lines 520, 530, and 540 correspond to AFRs measured by individual exhaust gas sensors positioned in the exhaust runners of a first, second and third individual cylinder, respectively, in an exhaust bank of 3 cylinders of a 6-cylinder engine. At time t1 (until time t2), a positive step-change AFR disturbance is introduced in each of the 3 cylinders. In other words the $AFR_{commanded}=1.55$ for each of the first, second, and third cylinders of the bank. At time t3 (until time t4), a second positive step-change AFR disturbance is introduced to only the first individual cylinder of the exhaust bank. In other words, $AFP_{commanded,1}=1.5$. As shown in the plot 500, cylinder interactions between the second and third cylinders and the first cylinder are manifested by deviations in the measured AFR signals of the second and third cylinders (520 and 530) at time t2. As an example, because of backmixing and/or intermixing of exhaust gases between the exhaust runners of the individual cylinders, an increase to the AFR of the first cylinder causes increases in the AFRs, and these deviations are detected and measured by the exhaust gas sensors positioned in the second and third exhaust gas runners. In other words, $AFR_{measured,1}=1.52$, $AFR_{measured,2}=1.25$, and $AFR_{measured,3}=1.17$. According to method 900, the interaction parameters between the first and second and first and third cylinders may be determined from equation (3). Thus, the interaction matrix of interaction parameters may be developed by introducing a disturbance in one cylinder and measuring it in each of the other cylinders.

Turning now to FIG. 6, it illustrates a control diagram 600 showing how feed forward and feedback control of AFR for individual engine cylinders can be integrated with closed loop control of bank-wise averaged AFR. As shown in the control diagram 600, controller 12 may communicate (transmit signals and receive signals from) various actuators and sensors 610 of the engine relating to control of cylinder AFR. Specifically, the controller 12 may receive input from the engine 10 and exhaust manifold 17 and 19, including sensors fluidly coupled thereto such as high-frequency exhaust gas sensors 163 and 164. As described above, high-frequency exhaust gas sensors positioned in individual exhaust runners may also be in electronic communication with the controller 12 during AFR cylinder control. During averaged (bank-wise) closed loop AFR control (as indicated by 620), the controller may receive input from the actuators and sensors 610, including measurement of the exhaust oxygen sensor(s) 163 and 164, and based on that feedback, control output variables such as fuel injection and air supply flow rates to the engine 10, specifically the engine cylinders, in order to achieve a target bank-wise AFR value. In the example control diagram 600, the individual cylinder AFR control loop 650 is decoupled from the bank-wise averaged closed-loop control loop 620 of the cylinder AFR. In this way the individual cylinder AFR control may be switched ON to augment and/or compensate the average closed-loop control of cylinder AFR. Furthermore, by decoupling the individual cylinder AFR control from the bank-wise averaged cylinder AFR control, existing controllers may be more easily retrofitted with individual cylinder AFR control algorithms described herein. Furthermore, the individual cylinder AFR control algorithm may be flexibly activated and deactivated, thereby reducing engine operation complexity while maintaining vehicle drivability. Further still, incorporating individual cylinder AFR control into engine operation, may reduce engine emissions, and may reduce NVH due to differences in torque production arising from individual cylinders as a result of different AFRs therein. Further still, if the fueling is controlled to be uniform in all the cylinders by correcting the transfer function of each injector by other means, the individual cylinder AFR control algorithm can aid in determining the airflow differences between each of the cylinders.

Upon activating the individual cylinder AFR control loop 650, the controller 12 performs an individual cylinder AFR binning operation 656, whereby the controller 12 parses the high-frequency signals from the exhaust gas oxygen sensors 163 and 164, in order to resolve the signal components corresponding to exhaust flow originating from each individual cylinder. Parsing and resolving the high-frequency composite exhaust gas flow signals from the exhaust gas oxygen sensors 163 and 164 may be referred to as individual cylinder AFR binning, whereby the controller 12 breaks down and separates the high-frequency sensor signal data into its cylinder-specific components. Here, the cylinder-specific components of the exhaust gas flow (as measured by exhaust gas sensors 163 and 164) refer to the exhaust gas flows originating principally from individual cylinders that could be measured by separate exhaust gas sensors positioned in each individual exhaust runner. The exhaust gas flows originating principally from individual cylinders that could be measured by separate exhaust gas sensors positioned in each individual exhaust runner include intercylinder exhaust flow interactions arising from mixing of exhaust gases exiting different exhaust runners, back-mixing from the exhaust manifold, and the like, as described above. In this way, the individual cylinder AFR binning can provide estimates for the individual cylinder exhaust flows (including exhaust gas flow rates, oxygen content, and gas composition), from which individual cylinder AFRs originating from each cylinder may be inferred.

The parsed and/or binned signals are passed to and processed by way of the interaction matrix 654. As described above, the interaction matrix may include a plurality of interaction matrices, each comprising an N×N matrix of interaction parameters, representing the exhaust flow interaction induced by the $i^{th}$ cylinder of a bank on to the $j^{th}$ cylinder of the bank. Each of the plurality of interaction matrices may be calibrated to a specific range of engine operating conditions (engine load, engine speed, VCT, and the like) such that variability, including non-linear variability, in the interaction parameters with engine operating conditions can be accounted for by the individual cylinder AFR controller 650. Processing the parsed signals from the individual AFR binning 656 may include applying the set of interaction parameters to the individual cylinder AFR estimates derived from the parsed signals, thereby removing intercylinder interactions from therefrom. By removing intercylinder interactions, the individual cylinder AFR estimates can be refined, such that deviations between the individual cylinder AFR estimates and the actual individual cylinder AFRs can be reduced relative to the case where the intercylinder interactions are not removed. The refined individual cylinder AFR estimates may then be normalized to the stoichiometric AFR ($\square$=AFR/AFR$_{stoich}$) as controller output values and correction factors, $C_k$, may be calculated for each $k^{th}$ cylinder in the bank based on deviations in the normalized controller output values and the target AFR values, according to equation (4);

$$C_k = \lambda_{target} - \lambda_{(estimated,corrected),k}; k=1 \text{ to } N \qquad \text{Equation 4}$$

The controller 12 may store the correction factors, $C_k$, as a function of engine operating conditions, and as a function of the deviations between the individual cylinder AFR estimates and the actual individual cylinder AFRs in adaptive tables 658. Accordingly, the stored $C_k$ values can be recalled from the adaptive tables 658 and applied for feed-forward compensation during individual cylinder AFR control and for augmenting averaged bank-wise closed loop control 620. Additionally, the correction factors may further be applied to the overall cylinder control outputs by summing them with the averaged closed loop control outputs in order to aid in balancing and reducing variability among individual cylinder AFRs. In the example of control diagram 600, the output values from the individual cylinder AFR control 650 may be employed as correction factors for the output values from the average closed-loop control 620 for each of respective individual cylinder AFRs. In this way, the individual cylinder AFR control 650 may be used to reduce AFR variability between cylinders as well as reduce deviations in individual and bank-wise AFR from the target AFR (e.g., for stoichiometric target AFR, $\square$=1).

Turning now to FIGS. 7 and 8, they illustrate flow charts for methods 700 and 800 for controlling individual cylinder AFRs in an engine system, such as engine system 100. Methods 700 and 800 may be performed by a controller 12 as executable instructions residing in non-transitory memory on board the engine. Controlling individual cylinder AFRs refers to separately measuring and/or estimating the AFR for each individual cylinder, and independently regulating fuel and air intake for each active individual cylinder. In contrast, bank-wise or averaged cylinder AFR control refers to measuring and/or estimating an averaged bank-wise AFR and supplying the same control action (e.g., fuel and air supply flow rates) to each cylinder of the bank.

Method 700 begins at 710 where the engine operating conditions such as engine ON status, load, engine speed, engine temperature, and the like are estimated and/or measured. Next, at 720, controller 12 measure the high-frequency exhaust gas composition. Measuring the high-frequency exhaust gas composition may also include measuring the exhaust gas flow rate, exhaust gas oxygen content, and may be performed by a high-frequency exhaust gas oxygen sensor positioned in an exhaust manifold downstream from the exhaust runners and upstream of the emissions control system. In engine systems including high-frequency exhaust gas sensors positioned in each exhaust runner, measuring the high-frequency exhaust gas composition may further include measuring the exhaust gas composition in each exhaust runner. Method 700 continues at 730 where the controller determines if individual cylinder AFR control is ON. If the individual cylinder AFR control is not ON, method 700 proceeds to 736 where the controller implements bank-wise control cylinder AFR, including averaging exhaust gas oxygen sensor measurements to estimate bank-wise cylinder AFR. For the case where individual cylinder AFR control is ON, method 700 continues at 740 where the controller 12 determines the individual cylinder AFR values, as shown in method 800 of FIG. 8.

At 806, method 800 determines individual cylinder AFR values for each $k^{th}$ cylinder. In other words 806 (steps 810 through 888) are executed for each individual cylinder (k P through N) of each cylinder bank. Method 800 continues at 810 where it determines if the $k^{th}$ cylinder is activated. The $k^{th}$ cylinder may be activated when fuel is being supplied to the cylinder (combustion), and may be deactivated when fuel supply is shut off to the cylinder (no combustion). As another example, a cylinder may be deactivated when its intake and exhaust valves are maintained in a closed position for more than a threshold valve closed duration. One or more individual cylinders may be deactivated in a variable displacement engine (VDE) during periods of reduced engine load to reduce fuel consumption. As a further example, (referring to FIG. 2) when an exhaust gas flow measured by the exhaust gas sensor 263 is greater than a threshold exhaust flow 268 during a cylinder-specific firing interval ($T_s$), the controller 12 may determine the cylinder corresponding to the cylinder-specific firing interval to be active. In this way, the exhaust gas flow sensor 263 may also aid in detecting deactivated cylinders which can reduce errors in AFR control and fueling of individual cylinders. For the case where the $k^{th}$ cylinder is deactivated, method 800 continues at 814 where the controller 12 sets the interaction parameters, $P_{kj}$ (j=1 to N), corresponding to the intercylinder interactions induced by exhaust gas flow from the $k^{th}$ cylinder on to the exhaust gas flow from the $j^{th}$ cylinder, to 0. Because intake and exhaust valves are closed and no fuel combustion occurs while a cylinder is deactivated, exhaust flow from a deactivated cylinder is reduced (or stopped), thus precluding intercylinder interactions induced by exhaust flow therefrom. Next, method 800 continues at 816 where the controller 12 maintains the value of the AFR correction factor, $C_k$, for the $k^{th}$ individual cylinder stored in memory. The AFR correction factor, may be applied as a correction to the bank-wise average control output, during control of the individual cylinder AFR.

Returning to 810 for the case where the cylinder is activated, method 900 continues at 820 where the high-frequency exhaust gas sensor signal data (e.g., exhaust gas flow rate, exhaust gas oxygen content, exhaust gas composition, and the like) may be parsed in order to resolve the signal into its constituent cylinder-specific components. Parsing the high-frequency exhaust gas sensor signal may include extracting a portion of the high-frequency sensor signal data corresponding to a threshold period, and dividing or breaking down the threshold period of high-frequency signal data into sequential cylinder-specific components. In one example, the threshold period may correspond to a firing cycle duration of the engine, during which each active cylinder of an engine (or a single bank of the engine) are fired at least once. In one example the cycle period, $T_c$ may be determined by $T_c=120/N$, where N is the engine speed in rpm. The firing duration may be determined by $T_f=T_c/n$, where n is the number of engine cylinders As an example, for a 4-cylinder engine operating at 1500 rpm, the engine firing frequency may be 50 Hz (corresponding to a cycle period of 0.08 s and a firing duration of 0.02 s). With reference to FIG. 2, the threshold period may correspond to a firing cycle period, $T_c$. Furthermore, the sequential cylinder-specific components may correspond to sequential firing intervals, $T_s$; both the threshold period and each firing interval, $T_s$, may be determined corresponding to crank angle timing events. For example, each firing interval may correspond to crank angle timing events during which each active individual cylinder may be fired during the firing cycle. Thus, the parsing or binning of the high-frequency exhaust gas sensor signal into sequential firing intervals within a threshold period of signal data can aid in determining and/or estimating individual cylinder AFR values by deconvoluting the high-frequency exhaust gas sensor signal into cylinder-specific portions and attributing each cylinder-specific portion of data to an active individual cylinder. Individual cylinder binning may be accomplished by resolving the exhaust gas sensor output signal into individual cylinder components based on their firing order in time. For example, in the case of an 8-cylinder engine, the exhaust gas sensor output signal over one firing cycle may be divided into 8 portions corresponding to 8 equal firing intervals of the 8 individual cylinders. The engine rpm may be used to determine the firing intervals, as described above. Individual cylinder binning may further include averaging the individual cylinder measurements with the historical average in the bin.

In further examples, parsing the high-frequency exhaust gas sensor signal may include extracting a portion of the high-frequency sensor signal data corresponding to multiple threshold periods, and dividing or breaking down each of the threshold periods of high-frequency signal data into their sequential cylinder-specific components. Processing a larger amount of sensor data before updating individual cylinder controller outputs (e.g., individual cylinder AFR correction factors) may reduce the responsiveness of the individual cylinder AFR control (beyond a firing cycle); however, the robustness of the individual cylinder AFR control may be increased by reducing an influence of outlier or noisy sensor signal data on controller output.

Next, method 800 continues at 830 where the controller estimates the AFR of individual cylinders based on the resolved (e.g., binned) cylinder-specific component. In one example, the resolved cylinder-specific component may correspond to a portion of the high-frequency sensor signal data during a firing interval, $T_s$, of the cylinder. The AFR of the $k^{th}$ individual cylinders may be estimated by averaging the cylinder-specific portions of the high-frequency exhaust gas data (e.g., exhaust gas flow rate, oxygen content, composition, and the like) and correlating the exhaust gas data to cylinder AFR. Each estimate of the $k^{th}$ individual cylinder AFR may be stored in memory buffers assigned to each cylinder. For example, the binned exhaust gas sensor data may include or be representative of the individual cylinder components of each particular cylinder in consecutive firing cycles. Averaging the individual cylinder components for a particular cylinder over several firing cycles can be performed to determine an estimation of the individual AFR, and when combined with the interaction parameters of the interaction matrix, can provide a refined estimate of the individual AFR of that particular cylinder. Continuing with method 800, at 840, the controller obtains the interaction parameters, $P_{ik}$ (i=1 to N) for determining intercylinder interactions induced by exhaust gas from the $i^{th}$ cylinder on the exhaust gas from the $k^{th}$ cylinder. The interaction parameters, $P_{ik}$, may be retrieved from a matrix of interaction parameters stored in non-transitory memory on board the vehicle controller 12. As described above with reference to FIG. 2, a plurality of matrices of interaction parameters may be stored, each matrix of interaction parameters corresponding to different sets or ranges of engine operating conditions. Accordingly, at 840, the controller 12 may retrieve the set of interaction parameters corresponding to the current set of engine operating conditions (engine speed, engine load, VCT, and the like). In this way, non-linearities and variability in the interaction parameters with engine operating conditions can be accounted for by the individual cylinder AFR control. Next, at 850 the controller applies the interaction parameters, $P_{ik}$, to correct the estimated AFR of the $k^{th}$ individual cylinder. Applying the interaction parameters, $P_{ik}$, effectively filters out or removes the influence of inter-cylinder interactions from the individual cylinder AFR estimates to calculate a corrected estimated AFR, $AFR_{estimated,corrected,k}$.

Next, at 860, the controller 12 calculates the AFR correction factor, $C_k$, based on a deviation between the $AFR_{target}$ and the $AFR_{estimated,corrected}$ for the $k^{th}$ individual cylinder. As described above, $C_k$ may further be normalized to the stoichiometric AFR such that $C_k$ is calculated based on the deviation between the $\square_{target}$ and the $\square_{estimated,corrected}$ for the $k^{th}$ individual cylinder. Method 800 continues at 870 where the controller 12 stores the calculated correction factor, $C_k$, and recalculates a matured AFR correction factor. Calculating the matured AFR correction factor may include averaging the calculated and stored $C_k$ values for a threshold number of cylinder firing cycles. In other words, calculating the matured AFR correction factor may include calculating a moving average of the $C_k$. The stored correction factors may include lookup tables of correction factors indexed by cylinder for a range of engine operating conditions.

Following 870, and also after 816, method 800 continues at 880 where the controller 12 determines if the correction factor, $C_k$, deviates from a threshold calibration factor, $C_{k,TH}$, by more than a threshold deviation, $\square C_{k,TH}$. In some examples, the matured AFR correction factor may be compared with $C_{k,TH}$ at 880. For the case where $(C_k - C_{k,T/H}) > \square C_{k,TH}$, method 800 continues to 884 where the controller 12 generates a faulty individual cylinder indication to the operator. In the event of detecting a faulty cylinder, the controller 12 may further recommend the operator to have the engine system serviced. $\square C_{k,TH}$ may refer to a threshold deviation of $C_k$ from $C_{k,TH}$ beyond which combustion in the cylinder is likely to be malfunctioning. As a result of the faulty cylinder, the controller 12 deactivates the faulty cylinder at 888. After 888, and following 880 for the case where $(C_k - C_k, T/H)$ is not greater than $\square C_{k,TH}$, method 800 returns to method 700 after 740.

Returning to method 700 at 750, the controller 12 determines if feed forward individual cylinder AFR control is ON. For the case where feed forward control is ON, method 700 continues at 760 where the controller 12 retrieves the stored correction factors, $C_k$, from lookup tables according to the individual $k^{th}$ cylinder and the current engine operating conditions. The retrieved stored correction factors may then be applied to the feed forward control algorithm to anticipate and reject process disturbances to the cylinder combustion that increase deviations in the individual cylinder AFR from the target AFR (e.g., stoichiometric AFR). Following 760, and following 750 for the case where feed forward control is OFF, method 700 continues at 770 where the controller 12 implements individual cylinder AFR feedback control. Individual cylinder AFR feedback control may be implemented by compensating the control output of the bank-wise averaged cylinder feedback control with the output (including the normalized output to the stoichiometric AFR), as described above with reference to control diagram 600 of FIG. 6. Accordingly, the individual cylinder AFR feed forward and/or feedback control may be integrated with and implemented to compensate the bank-wise averaged cylinder control to reduce variability in individual cylinder AFR. After 770, method 700 ends.

Turning now to FIG. 10, it illustrates an example timing plot 1000 for operating an engine system 100. In the example timing plot 1000, AFR control for a three-cylinder bank in a six-cylinder engine is illustrated. Timing plot 1000 includes trendlines for engine load 1010; cylinder active status for a three-cylinder bank of engine system 100 (e.g., cylinder no. 1 active status 1022, cylinder no. 2 active status 1024, cylinder no. 3 active status 1026); individual cylinder AFR control status 1030; $AFR_k$ for the $k^{th}$ cylinder of the three-cylinder bank ($AFR_1$ 1042, $AFR_2$ 1044, $AFR_3$ 1046); intercylinder interaction parameters for exhaust gas interactions induced by cylinder no. 3 on the $k^{th}$ cylinder, $P_{3k}$ ($P_{31}$ 1052, $P_{32}$ 1054, $P_{33}$ 1056); the deviation between the correction factor for the $k^{th}$ cylinder, $C_k$, and the threshold correction factor, $C_{k,TH}$, ($\Box C_1$ 1062, $\Box\Box C_2$ 1064, $\Box\Box C_3$ 1066); fault status for the $k^{th}$ cylinder (no. 1 1072, no. 2 1074, no. 3 1076); and the high-frequency exhaust gas oxygen sensor signal data 1080. Also included in timing plot 1000 are the stoichiometric air-fuel ratio, $AFR_{stoich}$ 1048, the bank-wise average AFR for cylinders 1-3, $AFR_{bank-wise,avg}$ 1040, and the threshold deviation between the correction factor for the $k^{th}$ cylinder, $C_k$, and the threshold correction factor, $\Box C_{TH}$ 1068. $AFR_k$ may be estimated during individual cylinder AFR control by the controller 12 by way of the methods 700 and 800 herein. When individual cylinder AFR control is OFF, the $AFR_k$ values are shown (as dashed lines) in timing plot 1000 for illustrative purposes. Cylinder interaction parameters, $P_{2k}$ and $P_{1k}$ (k=1 to 3) are not shown in timing plot 1000, for clarity and brevity.

Prior to time, $t_1$, the engine is operating at a lower engine load 1010 and individual cylinder AFR control is OFF. As such, the AFR for the active cylinders (prior to time $t_1$, cylinders nos. 1-3 are active) is controlled by the engine controller in a bank-wise averaged manner. Prior to time $t_1$, the actual individual cylinder AFR values, $AFR_1$ 1042 and $AFR_2$ 1044 are greater than $AFR_{stoich}$ 1048, while $AFR_3$ 1046 is less than $AFR_{stoich}$ 1048. The bank-wise AFR controller does not calculate or estimate the individual cylinder AFR values; they are depicted using dashed lines when the individual cylinder AFR control is OFF for illustrative purposes. The high-frequency exhaust gas oxygen sensor signal data 1040 indicates a bank-wise AFR greater than $AFR_{stoich}$ 1048, as reflected in the $AFR_{bank-wise,avg}$ 1040, which may be calculated and/or inferred by the controller 12 during the bank-wise AFR control from the high-frequency exhaust gas oxygen sensor signal data 1040. Accordingly, at time $t_1$, the controller 12, operating in bank-wise cylinder AFR control, adjusts fuel and/or air supply to the three-cylinder bank in order to reduce the $AFR_{bank-wise,avg}$ 1040; in other words each individual cylinder in the bank is subject to the same bank-wise fueling adjustments such that $AFR_1$ 1042, $AFR_2$ 1044, and $AFR_3$ 1046 in each cylinder are each lowered by about the same amount. As such, because the fuel and/or air supply adjustment is applied in a bank-wise manner, although $AFR_{bank-wise,avg}$ is reduced to a value nearer to $AFR_{stoich}$ after time $t_1$, the variability 1049 in the individual cylinder AFR values is not reduced. Furthermore, the deviation between $AFR_3$ 1046 and $AFR_{stoich}$ increases following the bank-wise AFR adjustment at time $t_1$. Thus, although the bank-wise cylinder AFR controller is able to adjust the $AFR_{bank-wise,avg}$ 1040 to be closer to $AFR_{stoich}$ 1048, detrimental effects on engine performance characteristics such as engine drivability, torque variability, emissions, and NVH arising from the variability in individual cylinder AFR values as well as their deviation from $AFR_{stoich}$ may continue unabated.

At time $t_2$, bank-wise averaged cylinder AFR control continues while cylinder no. 3 is deactivated. Because the bank-wise average cylinder AFR control may be insensitive to the cylinder deactivation events, the bank-wise cylinder AFR control does not make further adjustments to the cylinder fuel and/or air supply. Accordingly, the $AFR_{bank-wise,avg}$ across active cylinders (e.g., cylinder nos. 1 and 2) increases. Thus, at time $t_2$, under bank-wise average cylinder AFR control, the deviation of $AFR_{bank-wise,avg}$ from $AFR_{stoich}$, and the individual cylinder AFR imbalance are raised.

At time $t_3$, individual cylinder AFR control is switched ON. As described above, the individual cylinder AFR control may be decoupled from the bank-wise average cylinder AFR control loop, and may further act to compensate and augment control actions commanded by the bank-wise average cylinder AFR control. As part of the individual cylinder AFR control, the controller 12 parses the exhaust gas oxygen signal data 1080 in order to divide and resolve the signal data (representing exhaust gas flow from each of the cylinders in the bank) into its cylinder-specific components. As described above with reference to FIGS. 7 and 8, the controller 12 may parse the exhaust gas oxygen signal data 1080 by dividing one or more threshold periods of the signal data representing a firing cycle for the cylinder bank into cylinder-specific components represented by separate firing intervals corresponding to the firing of each cylinder. The firing intervals may be sequential time intervals during the firing cycle, and may correspond to cylinder-specific crank angles and/or crank timings for the engine. Next, the controller 12 may estimate individual cylinder AFR values from the separate cylinder-specific components parsed and resolved from the high-frequency signal data.

After estimating the individual cylinder AFR values, the controller 12 may retrieve cylinder interaction parameters from the cylinder interaction matrix corresponding to current engine operating conditions. Because cylinder no. 3 is deactivated, the interaction parameters corresponding to interactions induced by exhaust gas flow originating from cylinder 3 on to exhaust flow originating from the $k^{th}$ cylinder ($P_{3k}$; k=1 to 3) are zero. Although not illustrated in timing plot 1000, during execution of the individual cylinder AFR control, the controller 12 may retrieve interaction parameters ($P_{1k}$ and $P_{2k}$; k=1 to 3) representing interactions induced by the exhaust gas flow from cylinders nos. 1 and 2 corresponding to the current range of engine operating conditions (engine speed, load, VTC, and the like). For example, at time $t_3$, the controller 12 may retrieve the cylinder interaction parameters corresponding to a lower load condition. Furthermore, the controller 12 may apply the interaction parameters $P_{1k}$ and $P_{2k}$ to the individual cylinder AFR estimates in order to remove intercylinder interactions, thereby correcting the individual cylinder AFR estimates. The corrected intercylinder estimates are represented on timing plot 1000 after time $t_3$ by the solid trendlines shown for $AFR_1$ 1042, $AFR_2$ 1044, and $AFR_3$ 1046 after time $t_3$.

After correction of the individual AFR estimates, the controller 12 may calculate individual correction factors, $C_k$, based on the deviation of the corrected individual AFR estimates from $AFR_{stoich}$. The calculated correction factors may be normalized and output to the overall AFR control algorithm to compensate the output from the bank-wise averaged AFR control loop, and to refine the overall AFR cylinder control for the engine system 100. Furthermore, the deviation of $C_k$ from a calibrated threshold, $C_{k,TH}$ ($\Delta C_1$ 1062, $\Delta\Delta C_2$ 1064, $\Delta\Delta C_3$ 1066) may be compared to a threshold correction factor deviation for each $k^{th}$ cylinder to determine if a cylinder may be faulty. Between time $t_3$ and time $t_4$, $\Delta C_1$ 1062 and $\Delta\Delta C_2$ 1064 are less than $\Delta C_{TH}$, indicating no faulty cylinders. While cylinder no. 3 is deactivated, $C_3$ and $\Delta C_3$ are not computed by the individual cylinder AFR controller. In the example timing plot 1000, a single calibrated correction factor threshold, $\Delta C_{TH}$, based on a single threshold correction factor, $C_{TH}$, is shown for illustrative purposes, however, distinct calibrated correction factor thresholds, $\Delta\Delta C_{k,TH}$, for each $k^{th}$ cylinder may be employed.

As shown in timing plot 1000, following the switch from bank-wise averaged cylinder AFR control to bank-wise averaged cylinder AFR control compensated with individual cylinder AFR control at time $t_3$, the variability in individual cylinder AFR values is reduced, while also bringing $AFR_{bank-avg}$ closer to $AFR_{stoich}$. Furthermore, because the individual cylinder AFR control algorithm adjusts the fueling to each individual cylinder separately, the deactivation of cylinder no. 3 does not hinder the individual cylinder AFR control or adversely affect $AFR_{bank-wise,avg}$. In other words, whereas the deviation between $AFR_{bank-wise,avg}$ and $AFR_{stoich}$ increased during time $t_2$ to time $t_3$ when operating with bank-wise averaged AFR cylinder control (without compensation from the individual AFR cylinder control), between time $t_3$ and time $t_4$, activating individual AFR cylinder control enables reduction of the deviation of $AFR_{bank-wise,avg}$ from $AFR_{stoich}$, even during deactivation of the cylinder no. 3.

At time $t_4$, the cylinder no. 3 is activated. Because the individual AFR cylinder control remains ON, the controller 12 parses the exhaust gas oxygen signal data 1080 in order to divide and resolve the signal data (representing exhaust gas flow from each of the cylinders in the bank) into its cylinder-specific components. By parsing the high-frequency signal data and resolving the high-frequency data into separate cylinder-specific components, the controller 12 may calculate individual cylinder AFR estimates. Because cylinder no. 3 is activated, the controller 12 retrieves a refreshed set of the interaction parameters corresponding to interactions induced by exhaust gas flow originating from cylinder 3 on to exhaust flow originating from the $k^{th}$ cylinder ($P_{3k}$; k=1 to 3) from the interaction matrix corresponding to the current engine operating conditions (engine speed, engine load, VTC, and the like). Although not illustrated in timing plot 1000 for brevity, during execution of the individual cylinder AFR control algorithm, the controller 12 may also retrieve interaction parameters ($P_{1k}$ and $P_{2k}$; k=1 to 3) representing interactions induced by the exhaust gas flow from cylinders nos. 1 and 2.

As shown in the timing plot 1000, the interaction factor $P_{32}$ may be greater than $P_{31}$ because the exit from cylinder no. 2 exhaust runner may be positioned closer to the exit from cylinder no. 3 exhaust runner; thus, exhaust gas flow interactions induced by exhaust flow originating from cylinder no. 3 on to the exhaust flow from cylinder no. 2 may be higher than exhaust gas flow interactions induced by exhaust flow originating from cylinder no. 3 on to the exhaust flow from cylinder no. 1. Furthermore, $P_{33}$ may be greater than both $P_{32}$ and $P_{31}$ since the exhaust flow from cylinder no. 3 exhaust runner is directly correlated with itself. As described earlier, controller 12 may apply the interaction parameters $P_{1k}$, $P_{2k}$, and $P_{3k}$ to the individual cylinder AFR estimates in order to remove intercylinder interactions and correct the individual cylinder AFR estimates. After correction of the individual AFR estimates to remove intercylinder interactions, the controller 12 may calculate individual correction factors, $C_k$, based on the deviation of the individual AFR values from $AFR_{stoich}$. While cylinder no. 3 is activated, the controller 12 resumes computation of $C_3$, and the $\Delta C_3$. The calculated correction factors may be normalized and employed to compensate the output from the bank-wise averaged AFR control loop to refine the overall AFR cylinder control for the engine system 100. The deviation of $C_k$ from a calibrated threshold, $C_{k,TH}$ ($\Delta C_1$ 1062, $\Delta\Delta C_2$ 1064, $\Delta\Delta C_3$ 1066) may be compared to a threshold correction factor deviation for each $k^{th}$ cylinder to determine if a cylinder may be faulty. Between time $t_4$ and time $t_5$, $\Delta C_1$ 1062, $\Delta\Delta C_2$ 1064, and $\Delta\Delta C_3$ 1066 are each less than $C_{k,TH}$, indicating no faulty cylinders.

At time $t_5$, the engine load increases to a higher load. Individual cylinder AFR control remains ON and all of the cylinders of the bank remain activated. Because the individual AFR cylinder control remains ON, the controller 12 parses the exhaust gas oxygen signal data 1080 in order to divide and resolve the signal data (representing exhaust gas flow from each of the cylinders in the bank) into its cylinder-specific components. By parsing the high-frequency signal data and resolving the high-frequency data into separate cylinder-specific components, the controller 12 may calculate individual cylinder AFR estimates. Owing to the increase in engine load, the controller 12 retrieves a new set of interaction parameters corresponding to the higher load operating condition. As shown in timing plot 1000, the new interaction parameters, $P_{3k}$ ($P_{31}$, $P_{32}$, $P_{33}$) are higher relative to the interaction parameters prior to time $t_5$. In the example of timing plot 1000, the interaction parameters may increase with increasing engine load due to higher rates of fuel combustion and higher exhaust flows from the engine cylinders. The higher exhaust flows may give rise to higher back-mixing and intermixing of exhaust flows originating from each cylinder exhaust runner in the exhaust manifold, thereby raising intercylinder interactions. Despite the increase in intercylinder interactions, the individual cylinder AFR control is able to maintain a low variability in individual cylinder AFR values relative to the $AFR_{bank-wise,avg}$, by correcting the individual cylinder AFR estimates with the refreshed set of (higher) interaction parameters. Furthermore, the individual correction factors, $C_k$, and their computed deviations from the threshold correction factor, $C_{k,TH}$, remain less than the threshold deviation, $C_{k,TH}$, indicating no faulty cylinders. The calculated correction factors may be normalized and employed to compensate the output from the bank-wise averaged AFR control loop to refine the overall AFR cylinder control for the engine system 100.

At time t6, the engine load remains at the higher load value while individual cylinder AFR control remains ON and all of the cylinders in the bank remain activated. Because the individual AFR cylinder control remains ON, the controller 12 parses the exhaust gas oxygen signal data 1080 in order to divide and resolve the signal data (representing exhaust gas flow from each of the cylinders in the bank) into its cylinder-specific components. By parsing the high-frequency signal data and resolving the high-frequency data into separate cylinder-specific components, the controller 12 may calculate individual cylinder AFR estimates. Following correction of the individual cylinder AFR estimates by applying the interaction parameters ($P_{3k}$), the corrected $AFR_3$ 1046 suddenly decreases. As such, the computed deviation of the correction factor $C_3$ from the threshold correction factor increases above the threshold deviation, indicating a faulty cylinder. In response to the threshold correction factor increases above the threshold deviation, the controller 12 provides the operator with an indication of a faulty cylinder no. 3 (1076). The operator indication may include a visual and/or audible alarm at the operator panel of the vehicle.

In this way, individual cylinder AFR values for a cylinder bank may be accurately estimated by way of high-frequency exhaust gas flow and composition measurements from a single high-frequency exhaust gas oxygen sensor. Furthermore, by calibrating an engine system intercylinder interactions induced by exhaust flow originating from each individual cylinder on exhaust flows originating from other individual cylinders may be to determined. Further still, by conducting the calibration methods over a wide range of engine operating conditions (e.g., engine load, engine speed, VCT, and the like), non-linear variability in the intercylinder interactions may be precisely accounted for. Further still, storing matrices of interaction parameters quantifying the intercylinder interactions at different engine operating conditions allows for an individual cylinder AFR control algorithm to expeditiously retrieve sets of interaction parameters corresponding to a current set of engine operating conditions; as such, estimates for individual cylinder AFR values based on parsed high-frequency exhaust gas flow sensor signal data may be corrected with the intercylinder interaction parameters by removing the influence of intercylinder interactions. Further still, the corrected intercylinder AFR estimates may be normalized and compared to target individual AFR values for calculating normalized controller correction factors. These normalized controller correction factors can be compared to calibrated threshold controller correction factors to assess and indicate faulty cylinders. Accordingly, AFR variability between individual cylinders of a combustion engine can be reduced, thereby increasing vehicle drivability, reducing engine NVH, and reducing emissions. The technical effect of parsing high-frequency exhaust gas flow sensor signal data to estimate individual cylinder AFR values and correcting the estimated individual cylinder AFR values by removing intercylinder interactions is that individual cylinder AFR values in a bank can be determined from a single high-frequency exhaust gas composition sensor positioned in the exhaust manifold; a further technical effect is that individual cylinder AFR variability may be reduced, while maintaining and/or reducing engine manufacturing cost and complexity.

As one embodiment, a method for an engine is provided, comprising measuring a high-frequency exhaust gas composition, and for a first cylinder of the engine, parsing the measured high-frequency exhaust gas composition to determine a first cylinder-specific component of the high-frequency exhaust gas composition, estimating an air-fuel ratio (AFR) based on the first cylinder-specific component of the measured high-frequency exhaust gas composition, and correcting the estimated AFR by subtracting intercylinder exhaust gas interactions from the estimated AFR. In such an example, measuring the high-frequency exhaust gas composition may additionally or alternatively comprise measuring the high-frequency exhaust gas composition for a threshold duration. The first cylinder-specific component may additionally or alternatively comprise a portion of the measured high-frequency exhaust gas composition derived from exhaust gas expelled from the first cylinder. In some examples, the intercylinder exhaust gas interactions may additionally or alternatively comprise contributions to the measured high-frequency exhaust gas composition signal from cylinders other than the first cylinder. Furthermore, in any of the preceding embodiments, the method may additionally or alternatively comprise, for each cylinder of the engine, estimating an AFR based on a cylinder-specific component of the measured high-frequency exhaust gas composition, and correcting the estimated AFR by subtracting intercylinder exhaust gas interactions from the estimated AFRs. In some examples, the method may additionally or alternatively comprise, for the first cylinder, calculating an AFR correction factor based on the deviation of the corrected estimated AFR from a target AFR, and applying the AFR correction factor to feedback control of the AFR to reduce deviation of the AFR from the target AFR. In any of the preceding embodiments, the method may additionally or alternatively comprise, for the first cylinder, storing the calculated AFR correction factor, and applying the AFR correction factor to feedforward control of the AFR to reduce deviation of the AFR from the target AFR. Furthermore, in any of the preceding embodiments, the method may additionally or alternatively comprise, for the first cylinder, determining the first cylinder is faulty when a deviation between the stored calculated AFR correction factor and a predetermined AFR correction factor is greater than a threshold deviation.

In another embodiment, a method of estimating air-fuel ratio in individual engine cylinders is provided, comprising measuring an exhaust gas composition at a measurement frequency above a threshold frequency, and for exhaust gas composition data measured over a threshold period, resolving the measured exhaust gas composition data into cylinder-specific components, estimating an air-fuel ratio (AFR) of each individual engine cylinder based on the resolved cylinder-specific components, and correcting the estimated AFR of each individual engine cylinder, including applying an interaction matrix of binary interaction parameters to remove intercylinder exhaust gas interaction contributions from the estimated AFR of each individual engine cylinder. In such an example, the threshold period may additionally or alternatively comprise one firing cycle for a bank of engine cylinders corresponding to the individual engine cylinders. Furthermore, resolving the measured exhaust gas composition data measured over the threshold period into engine cylinder-specific components may additionally or alternatively comprise dividing the data into sequential time intervals corresponding to the firing sequence of the individual engine cylinders, and assigning the measured exhaust composition data over each of the sequential time interval to the corresponding engine cylinder. In another example, resolving the measured exhaust gas composition data measured over the threshold period into engine cylinder-specific components may additionally or alternatively comprises dividing the data into sequential event intervals corresponding to the firing sequence of the individual engine cylinders, and assigning the measured exhaust composition data over each event interval to the corresponding engine cylinder. In some examples, each sequential event interval may additionally or alternatively comprise a pulse of the of exhaust composition data above a threshold amplitude. In any of the preceding embodiments comprising applying the interaction matrix, the interaction matrix may additionally or alternatively comprise i×j binary interaction parameters, i and j varying from 1 to n, n being a number of individual engine cylinders, and each of the $ij^{th}$ binary interaction parameters quantifying a binary exhaust gas composition interaction induced by the exhaust gas expelled from the $i^{th}$ engine cylinder on the exhaust gas expelled from the $j^{th}$ engine cylinder. In some examples, removing the intercylinder exhaust gas interaction contributions from the estimated AFR of each $j=k^{th}$ engine cylinder may additionally or alternatively include applying each $ik^{th}$ binary interaction parameter to the estimated AFR of the $k^{th}$ engine cylinder. Furthermore, in any of the preceding embodiments comprising applying the interaction matrix, applying the interaction matrix may additionally or alternatively include applying the $ij^{th}$ binary interaction parameter corresponding to a current engine load and a current engine speed, each of the $ij^{th}$ binary interaction parameter varying with engine speed and engine load.

In another example, an engine system is provided, comprising a first bank of combustion cylinders, each of the combustion cylinders of the first bank exhaustively coupled by way of a separate cylinder exhaust runner to a first exhaust manifold, a first high-frequency exhaust gas composition sensor fluidly coupled to the first exhaust manifold, and a controller, including executable instructions thereon to, measure a high-frequency exhaust gas composition at the first high-frequency exhaust gas composition sensor, and for a first combustion cylinder of the first bank, parse the measured high-frequency exhaust gas composition to determine a first combustion cylinder-specific component of the high-frequency exhaust gas composition, estimate an air-fuel ratio (AFR) based on the first combustion cylinder-specific component of the measured high-frequency exhaust gas composition, and correct the estimated AFR by removing intercylinder exhaust gas interactions from the estimated AFR. In such an example, the engine system may additionally or alternatively comprise a second bank of combustion cylinders, each of the combustion cylinders of the second bank exhaustively coupled by way of a separate cylinder exhaust runner to a second exhaust manifold, a second high-frequency exhaust gas composition sensor fluidly coupled to the second exhaust manifold, and a controller, including executable instructions thereon to, measure a high-frequency exhaust gas composition at the second high-frequency exhaust gas composition sensor, and for a first combustion cylinder of the second bank, parse the measured high-frequency exhaust gas composition to determine a first combustion cylinder-specific component of the high-frequency exhaust gas composition, estimate an air-fuel ratio (AFR) based on the first combustion cylinder-specific component of the measured high-frequency exhaust gas composition, and correct the estimated AFR by removing intercylinder exhaust gas interactions from the estimated AFR. In any of the preceding embodiments comprising the engine system, the first high-frequency exhaust gas composition sensor may additionally or alternatively be positioned downstream from the separate cylinder exhaust runners, and upstream of an emission control device. In any of the preceding embodiments comprising the executable instructions to measure the high-frequency exhaust gas composition, measuring the high-frequency exhaust gas composition may additionally or alternatively comprise measuring an exhaust gas composition at a sampling rate below a threshold sampling rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. An engine system, comprising:
a first bank of combustion cylinders, each of the combustion cylinders of the first bank exhaustively coupled by way of a separate cylinder exhaust runner to a first exhaust manifold;
a first high-frequency exhaust gas composition sensor fluidly coupled to the first exhaust manifold; and
a controller, including executable instructions thereon to,
measure a high-frequency exhaust gas composition at the first high-frequency exhaust gas composition sensor, and for a first combustion cylinder of the first bank,
parse the measured high-frequency exhaust gas composition to determine a first combustion cylinder-specific component of the high-frequency exhaust gas composition;
estimate an air-fuel ratio (AFR) based on the first combustion cylinder-specific component of the measured high-frequency exhaust gas composition; and
correct the estimated AFR by removing intercylinder exhaust gas interactions from the estimated AFR.
2. The engine system of claim 1, further comprising:
a second bank of combustion cylinders, each of the combustion cylinders of the second bank exhaustively coupled by way of a separate cylinder exhaust runner to a second exhaust manifold;

a second high-frequency exhaust gas composition sensor fluidly coupled to the second exhaust manifold; and a controller, including executable instructions thereon to,
measure a high-frequency exhaust gas composition at the second high-frequency exhaust gas composition sensor, and for a first combustion cylinder of the second bank,
parse the measured high-frequency exhaust gas composition to determine a first combustion cylinder-specific component of the high-frequency exhaust gas composition;
estimate an air-fuel ratio (AFR) based on the first combustion cylinder-specific component of the measured high-frequency exhaust gas composition; and
correct the estimated AFR by removing intercylinder exhaust gas interactions from the estimated AFR.

3. The engine system of claim 1, wherein the first high-frequency exhaust gas composition sensors is positioned downstream from the separate cylinder exhaust runners, and upstream of an emission control device.

4. The engine system of claim 3, wherein the executable instructions to measure the high-frequency exhaust gas composition include measuring the high-frequency exhaust gas composition comprises measuring an exhaust gas composition below a threshold sampling rate.

5. A method for an engine, comprising:
measuring a high-frequency exhaust gas composition, and for a first cylinder of the engine,
parsing the measured high-frequency exhaust gas composition to determine a first cylinder-specific component of the high-frequency exhaust gas composition;
estimating an air-fuel ratio (AFR) based on the first cylinder-specific component of the measured high-frequency exhaust gas composition; and
correcting the estimated AFR by subtracting intercylinder exhaust gas interactions from the estimated AFR.

6. The method of claim 5, wherein measuring the high-frequency exhaust gas composition comprises measuring the high-frequency exhaust gas composition for a threshold duration.

7. The method of claim 5, wherein the first cylinder-specific component comprises a portion of the measured high-frequency exhaust gas composition derived from exhaust gas expelled from the first cylinder.

8. The method of claim 5, wherein the intercylinder exhaust gas interactions comprise contributions to the measured high-frequency exhaust gas composition signal from cylinders other than the first cylinder.

9. The method of claim 5, further comprising, for each cylinder of the engine, estimating an AFR based on a cylinder-specific component of the measured high-frequency exhaust gas composition; and
correcting the estimated AFR by subtracting intercylinder exhaust gas interactions from the estimated AFRs.

10. The method of claim 5, further comprising, for the first cylinder,
calculating an AFR correction factor based on the deviation of the corrected estimated AFR from a target AFR, and
applying the AFR correction factor to feedback control of the AFR to reduce deviation of the AFR from the target AFR.

11. The method of claim 10, further comprising, for the first cylinder,
storing the calculated AFR correction factor, and
applying the AFR correction factor to feedforward control of the AFR to reduce deviation of the AFR from the target AFR.

12. The method of claim 11, further comprising, for the first cylinder,
determining the first cylinder is faulty when a deviation between the stored calculated AFR correction factor and a predetermined AFR correction factor is greater than a threshold deviation.

13. A method of estimating air-fuel ratio in individual engine cylinders, comprising:
measuring an exhaust gas composition at a measurement frequency above a threshold frequency, and for exhaust gas composition data measured over a threshold period, resolving the measured exhaust gas composition data into cylinder-specific components,
estimating an air-fuel ratio (AFR) of each individual engine cylinder based on the resolved cylinder-specific components, and
correcting the estimated AFR of each individual engine cylinder, including applying an interaction matrix of binary interaction parameters to remove intercylinder exhaust gas interaction contributions from the estimated AFR of each individual engine cylinder.

14. The method of claim 13, wherein the threshold period comprises one firing cycle for a bank of engine cylinders corresponding to the individual engine cylinders.

15. The method of claim of claim 13, wherein resolving the measured exhaust gas composition data measured over the threshold period into engine cylinder-specific components comprises dividing the data into sequential time intervals corresponding to the firing sequence of the individual engine cylinders, and assigning the measured exhaust composition data over each of the sequential time interval to the corresponding engine cylinder.

16. The method of claim 13, wherein resolving the measured exhaust gas composition data measured over the threshold period into engine cylinder-specific components comprises dividing the data into sequential event intervals corresponding to the firing sequence of the individual engine cylinders, and assigning the measured exhaust composition data over each event interval to the corresponding engine cylinder.

17. The method of claim 16, wherein each sequential event interval comprises a pulse of the of exhaust composition data above a threshold amplitude.

18. The method of claim 13, wherein applying the interaction matrix includes applying the interaction matrix, wherein the interaction matrix comprises i×j binary interaction parameters, i and j varying from 1 to n, n being a number of individual engine cylinders, and each of the $ij^{th}$ binary interaction parameters quantifying a binary exhaust gas composition interaction induced by the exhaust gas expelled from the $i^{th}$ engine cylinder on the exhaust gas expelled from the $j^{th}$ engine cylinder.

19. The method of claim 18, wherein removing the intercylinder exhaust gas interaction contributions from the estimated AFR of each $j=k^{th}$ engine cylinder includes applying each $ik^{th}$ binary interaction parameter to the estimated AFR of the $k^{th}$ engine cylinder.

20. The method of claim 19, wherein applying the interaction matrix includes applying the $ij^{th}$ binary interaction parameter corresponding to a current engine load and a current engine speed, each of the $ij^{th}$ binary interaction parameter varying with engine speed and engine load.

* * * * *